United States Patent
Okada et al.

(10) Patent No.: US 10,882,486 B2
(45) Date of Patent: Jan. 5, 2021

(54) SIDE AIRBAG DEVICE

(71) Applicants: MAZDA MOTOR CORPORATION, Hiroshima (JP); ASHIMORI INDUSTRY CO., LTD., Settsu (JP)

(72) Inventors: Shinji Okada, Hiroshima (JP); Yuichi Sugimura, Higashihiroshima (JP); Hidetaka Azuma, Osaka (JP); Takahiko Yamamura, Osaka (JP); Ichiro Yokomi, Osaka (JP); Tetsuro Hamada, Osaka (JP)

(73) Assignees: Mazda Motor Corporation, Hiroshima (JP); Ashimori Industry Co., Ltd., Osaka (JP)

( * ) Notice: Subject to any disclaimer, the term of this patent is extended or adjusted under 35 U.S.C. 154(b) by 88 days.

(21) Appl. No.: 16/268,120

(22) Filed: Feb. 5, 2019

(65) Prior Publication Data
US 2019/0241146 A1    Aug. 8, 2019

(30) Foreign Application Priority Data

Feb. 6, 2018  (JP) .................................. 2018-019364
Oct. 11, 2018  (JP) .................................. 2018-192553

(51) Int. Cl.
*B60R 21/233*    (2006.01)
*B60R 21/207*    (2006.01)
(Continued)

(52) U.S. Cl.
CPC .......... *B60R 21/233* (2013.01); *B60R 21/207* (2013.01); *B60R 21/235* (2013.01);
(Continued)

(58) Field of Classification Search
CPC . B60R 21/233; B60R 21/207; B60R 21/2334; B60R 21/235; B60R 21/237; B60R 21/239; B60R 21/264; B60R 2021/006; B60R 2021/0032; B60R 2021/0055; B60R 2021/0058; B60R 2021/23324; B60R 2021/23509;
(Continued)

(56) References Cited

U.S. PATENT DOCUMENTS 8,714,588 B2    5/2014  Honda et al.
2004/0021304 A1*  2/2004  Tanase .................. B60R 21/233
                                        280/729

(Continued)

*Primary Examiner* — Drew J Brown
(74) *Attorney, Agent, or Firm* — Hamre, Schumann, Mueller & Larson, P.C.

(57) ABSTRACT

The side airbag device includes an inflator and a side airbag that is stored in a folded state in a side portion of a seatback of a vehicle seat and is inflatable and deployable in a space between a vehicle sidewall and a side portion of an occupant. The side airbag includes an outer bag and an inner bag. The inner bag houses the inflator and is disposed at a rear portion of the outer bag along an extending direction of the seatback. The outer bag is provided with a vent hole configured to communicate with an outside. The inner bag is provided with a gas circulating hole configured to communicate with the outer bag. The gas circulating hole is disposed at a position to be blocked by the outer bag when the side airbag in an inflated and deployed state is pressed between the occupant and the vehicle sidewall.

12 Claims, 18 Drawing Sheets

(51) Int. Cl.
  *B60R 21/2334* (2011.01)
  *B60R 21/235* (2006.01)
  *B60R 21/237* (2006.01)
  *B60R 21/239* (2006.01)
  *B60R 21/264* (2006.01)
  *B60R 21/00* (2006.01)

(52) U.S. Cl.
  CPC .......... *B60R 21/237* (2013.01); *B60R 21/239* (2013.01); *B60R 21/2334* (2013.01); *B60R 21/264* (2013.01); *B60R 2021/0006* (2013.01); *B60R 2021/0032* (2013.01); *B60R 2021/0055* (2013.01); *B60R 2021/0058* (2013.01); *B60R 2021/23324* (2013.01); *B60R 2021/23509* (2013.01)

(58) Field of Classification Search
  CPC B60R 2021/23146; B60R 2021/23332; B60R 21/23138
  See application file for complete search history.

(56) References Cited

U.S. PATENT DOCUMENTS

| | | | |
|---|---|---|---|
| 2007/0138773 A1* | 6/2007 | Song | B60R 21/231 |
| | | | 280/729 |
| 2015/0266446 A1* | 9/2015 | Grindle | B60R 21/233 |
| | | | 280/729 |
| 2015/0321638 A1* | 11/2015 | Sugimoto | B60R 21/261 |
| | | | 280/729 |
| 2017/0197579 A1* | 7/2017 | Taguchi | B60R 21/207 |
| 2018/0297549 A1* | 10/2018 | Kobayashi | B60R 21/23138 |
| 2019/0118759 A1* | 4/2019 | Kobayashi | B60R 21/23138 |
| 2019/0232914 A1* | 8/2019 | Kobayashi | B60R 21/23138 |

* cited by examiner

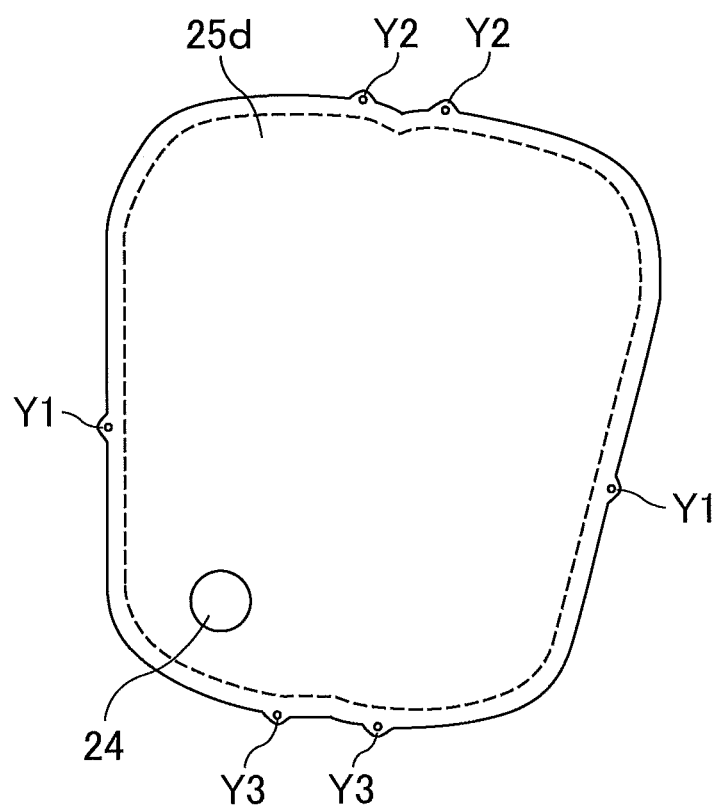

SIDE AIRBAG DEVICE

CROSS-REFERENCE TO RELATED APPLICATIONS

The present application claims priority under 35 U.S.C. § 119 to Japanese Patent Application No. 2018-019364 filed on Feb. 6, 2018, the contents of which are incorporated herein by reference in their entirety.

BACKGROUND OF THE INVENTION

Field of the Invention

The invention relates to a side airbag device. The invention specifically relates to a side airbag device that inflates and deploys to protect an occupant in case of a lateral collision of a vehicle such as an automobile.

Discussion of the Background

Side airbag devices are devices configured to deploy a side airbag inflated by a gas introduced thereinto toward the vehicle sidewall side of an occupant seated in a vehicle seat to protect, in a lateral collision of a vehicle, a side portion of the occupant from a sidewall of a struck vehicle intruding into an interior of the struck vehicle.

For example, U.S. Pat. No. 8,714,588 discloses a side airbag device for improving the performance of protecting an occupant against an impact in a lateral collision of a vehicle by efficiently moving the occupant toward the inner side of the vehicle using an inflated portion of an airbag. This side airbag device is provided with a pressure-control valve that regulates or allows gas flow on a partitioning member that partitions the inflated portion of the airbag into an upstream inflated portion and a downstream inflated portion. In the lateral collision of the vehicle, a gas is generated from an inflator disposed on the upstream inflated portion and, because the pressure-control valve is closed, inflates the upstream inflated portion alone to make a rear portion of the airbag in a high-pressure state. In this initial stage of inflation and deployment of the airbag, the rear portion of the airbag is to protect the back (back portion of the torso), which is a relatively stiff portion, of the torso of the occupant, i.e., to receive an impact from the vehicle sidewall by the back of the occupant. Then, the upstream inflated portion is pressed and the pressure-control valve is open, so that the gas is allowed to flow from the upstream inflated portion (the rear portion of the airbag) to the downstream inflated portion (the front portion of the airbag). Thereby, the downstream inflated portion is also inflated and protects the whole torso of the occupant.

SUMMARY OF THE INVENTION

In consideration of an actual collision involving a high lateral collision speed of a vehicle and a high impact energy thereof, the impact energy caused by the vehicle sidewall cannot be absorbed by the initial inflation and deployment of an airbag alone. Thus, the inner pressure in the airbag needs to be maintained at a high level for a long period of time. In response to this issue, in the side airbag device of U.S. Pat. No. 8,714,588, the inner pressure in the rear portion (upstream inflated portion) alone of the airbag is increased at the initial stage of inflation and deployment of the airbag to protect the back of an occupant. Still, as the inflation and deployment of the airbag further proceed, the inner pressure in the front portion (downstream inflated portion) of the airbag is increased to absorb the impact energy caused by the vehicle sidewall. In this case, the reaction force from the pressed airbag is applied to the chest, which is a relatively weak portion, of the torso (front portion of the torso) of the occupant, so that the occupant may not be protected appropriately.

The invention is made in view of the above current state of the art, and aims to provide a side airbag device capable of appropriately protecting an occupant without a large impact on the chest of the occupant even in a lateral collision of the vehicle involving a high lateral collision speed of the vehicle and a high impact energy thereof.

An aspect of the invention relates to a side airbag device including: an inflator configured to generate a gas; and a side airbag that is stored in a folded state in a side portion of a seatback of a vehicle seat and is inflatable and deployable in a lateral space between a vehicle sidewall and a side portion of an occupant seated in the vehicle seat in response to the gas upon activation of the inflator to protect the side portion of the occupant. The side airbag includes an outer bag and an inner bag. The inner bag houses the inflator and is disposed at a rear portion of the outer bag along an extending direction of the seatback. The outer bag is provided with a vent hole configured to communicate with an outside of the side airbag. The inner bag is provided with a gas circulating hole configured to communicate with the outer bag. The gas circulating hole is disposed at a position to be blocked by the outer bag when the side airbag in an inflated and deployed state is pressed between the occupant and the vehicle sidewall.

The invention can provide a side airbag device capable of appropriately protecting an occupant without a large impact on the chest of the occupant even in a lateral collision of a vehicle involving a high lateral collision speed of the vehicle and a high impact energy thereof.

BRIEF DESCRIPTION OF THE DRAWINGS

FIG. 1A shows a state seen from an outer side and FIG. 1B shows a state seen from an upper side.

FIG. 2A shows a state seen from an outer side and FIG. 2B shows a state seen from an upper side.

FIG. 3A is a cross-sectional view taken along the line A1-A2 and FIG. 3B is a cross-sectional view taken along the line B1-B2.

FIG. 5 is a schematic plan view of a base fabric piece composing an inner base fabric piece shown in FIGS. 2A, 3A, and 3B.

FIG. 6A shows a state seen from an outer side and FIG. 6B shows a state seen from an upper side.

FIG. 7A is a cross-sectional view taken along the line A3-A4 and FIG. 7B is a cross-sectional view taken along the line B3-B4.

FIG. 8A is a cross-sectional view taken along the line B1-B2 in FIG. 2A in an early stage of occupant restriction and FIG. 8B is a cross-sectional view taken along the line B3-B4 in FIG. 6A in a middle stage of occupant restriction.

FIG. 9A is a cross-sectional view taken along the line B1-B2 in FIG. 2A in an early stage of occupant restriction and FIG. 9B is a cross-sectional view taken along the line B3-B4 in FIG. 6A in a middle stage of occupant restriction.

FIG. 10A shows a state seen from an outer side and FIG. 10B shows a state seen from an upper side.

FIG. 11A shows a state seen from an outer side and FIG. 11B shows a state seen from an upper side.

FIG. 12A is a cross-sectional view taken along the line A1-A2 and FIG. 12B is a cross-sectional view taken along the line B1-B2.

FIG. 14A shows a state seen from an outer side and FIG. 14B shows a state seen from an upper side.

FIG. 15A is a cross-sectional view taken along the line A3-A4 and FIG. 15B is a cross-sectional view taken along the line B3-B4.

FIG. 16A shows a state seen from an outer side and FIG. 16B shows a state seen from an upper side.

DESCRIPTION OF EMBODIMENTS

Embodiment 1

A side airbag device of Embodiment 1 is described below with reference to the drawings, with the inflating and deploying behavior of the side airbag being focused on. The directions and sides herein are described relative to a vehicle unless otherwise mentioned. For example, the "front side" indicates a side based on the forward direction of a vehicle; the "rear side" indicates a side based on the backward direction of a vehicle; the "upper side" indicates a side based on the upward direction of a vehicle; the "lower side" indicates a side based on the downward direction of a vehicle; and the "outer side" indicates a side based on the outward direction of the width direction of a vehicle. The arrow FR, the arrow UP, and the arrow OUT drawn in the figures as appropriate respectively indicate the forward direction of a vehicle, the upward direction of a vehicle, and the outward direction of the width direction of a vehicle. The members placed inside a vehicle seat are illustrated in see-through figures of the vehicle seat.

(Before Inflation and Deployment)

Figure 1A:
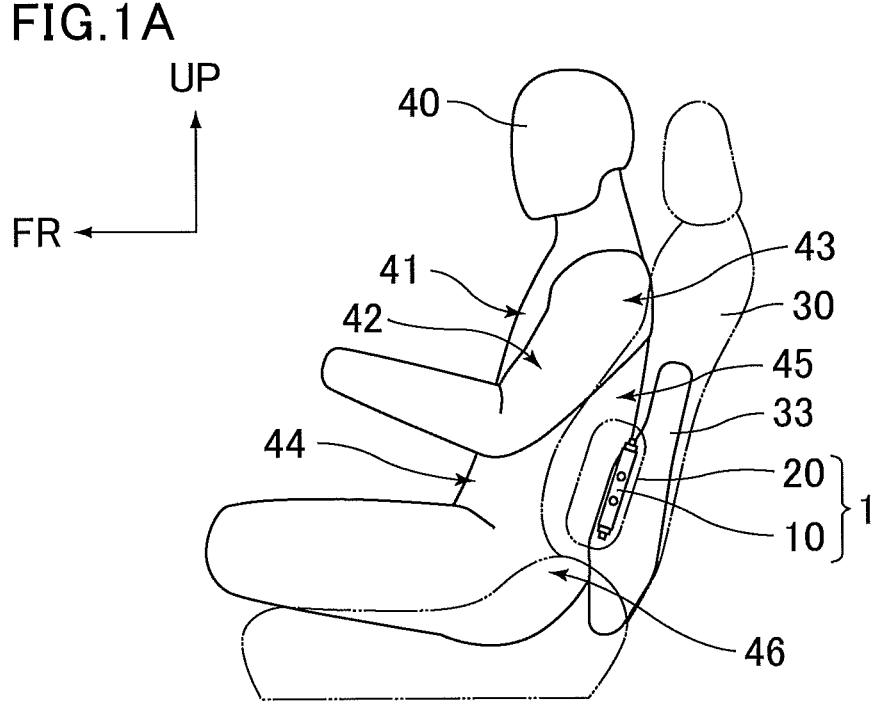
FIGS. 1A and 1B are schematic views of a side airbag device of Embodiment 1 before inflation and deployment of a side airbag.
Figure 1B:
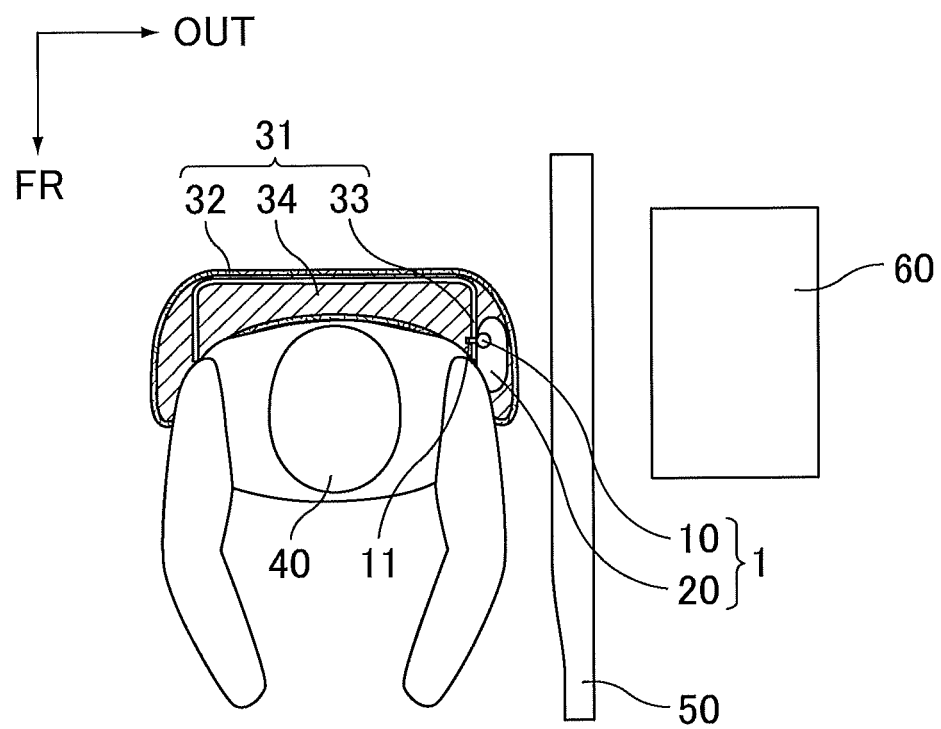

FIGS. 1A and 1B are schematic views of a side airbag device of Embodiment 1 before inflation and deployment of a side airbag; FIG. 1A shows a state seen from an outer side and FIG. 1B shows a state seen from an upper side.

As shown in FIGS. 1A and 1B, a side airbag device 1 is attached to a side portion (side portion on a vehicle sidewall 50 side) of a seatback (backrest) 31 of a vehicle seat 30.

The vehicle seat 30 may be a driver's seat or a passenger seat of a vehicle, for example.

In the present embodiment, a world side impact dummy (World-SID) 40 is seated in the vehicle seat 30. The sitting position of the world side impact dummy 40 is in conformity with the side impact test (ECE R95) used in Japan and Europe or the side impact test (FMVSS214) used in the U.S. at present. The position and size of a side airbag 20 in an inflated and deployed state are determined in accordance with the positions of a chest 41, an upper arm 42, a shoulder 43, an abdomen 44, a back 45, and a hip 46 of the world side impact dummy 40 illustrated in FIG. 1A. The world side impact dummy 40 is hereinafter referred to as the "occupant 40".

The vehicle sidewall 50 may be any vehicle part placed on the outer side of the occupant 40 seated in the vehicle seat 30, and collectively refers to parts such as side doors, pillars, and side windows.

As shown in FIG. 1A, the side airbag device 1 includes the bag-shaped side airbag 20 in an inflatably and deployably folded state and an inflator 10 disposed inside the side airbag 20.

The side airbag 20 before inflation and deployment in a folded state is mounted on a side frame 33 placed at the side portion of the seatback 31, and is stored together with a cushion pad 34 while being covered with an outer layer 32 of the seatback 31.

The inflator 10 is a cylindrical (columnar) gas-generating device, and is disposed along the extending direction (height direction) of the seatback 31. A pair of bolts 11 protrudes from upper and lower portions of the inflator 10, and this pair of bolts 11 penetrates the side airbag 20. The bolts 11 attach the inflator 10 to the side frame 33 of the seatback 31.

The inflator 10 is activated in case of a lateral collision of the vehicle. Specifically, first, when an impact sensor mounted on the vehicle detects the lateral collision of the vehicle, the sensor transmits a signal to an engine control unit (ECU) and the ECU calculates and determines the collision level. If the determined collision level corresponds to a level at which the side airbag 20 should be inflated, the inflator 10 is ignited to generate a gas by a chemical reaction due to combustion. The gas generated in the inflator 10 is then introduced into the side airbag 20.

The inflator 10 may be of any type, and may be a pyrotechnic inflator which utilizes a gas generated by combusting a gas-generating agent, a stored gas inflator utilizing a compressed gas, or a hybrid inflator utilizing a gas mixture of a gas generated by combusting a gas-generating agent and a compressed gas, for example.

(Early Stage of Occupant Restriction)

Figure 2A:
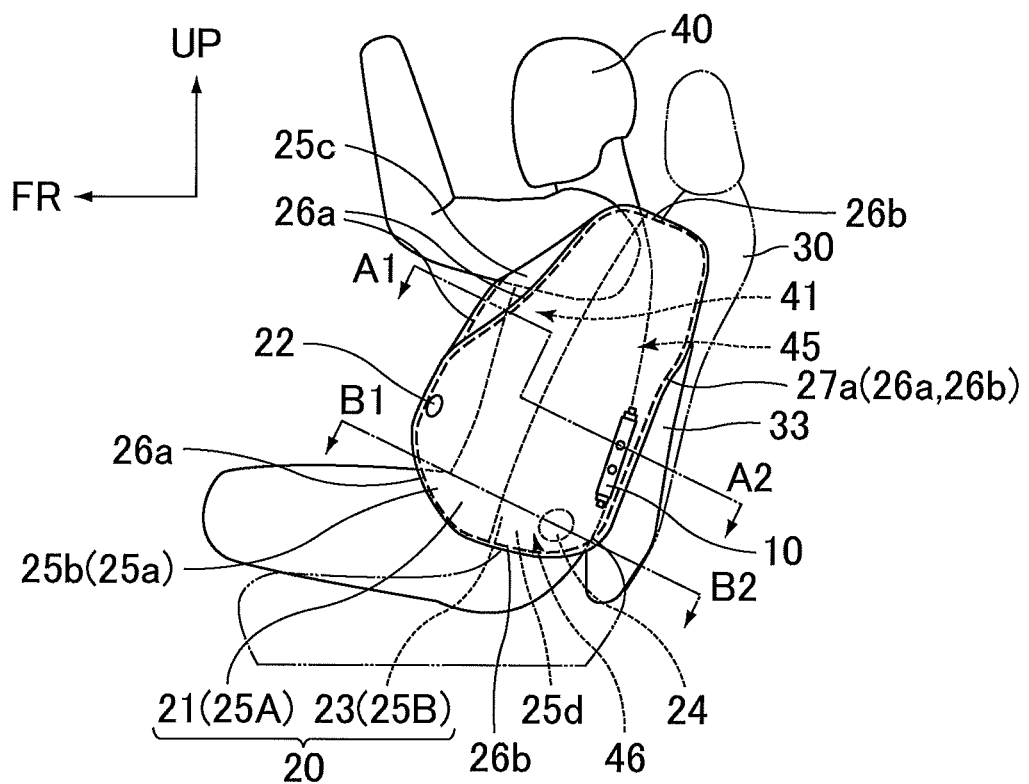
FIGS. 2A and 2B are schematic views of the side airbag device of Embodiment 1 in an early stage of occupant restriction by the side airbag.
Figure 2B:
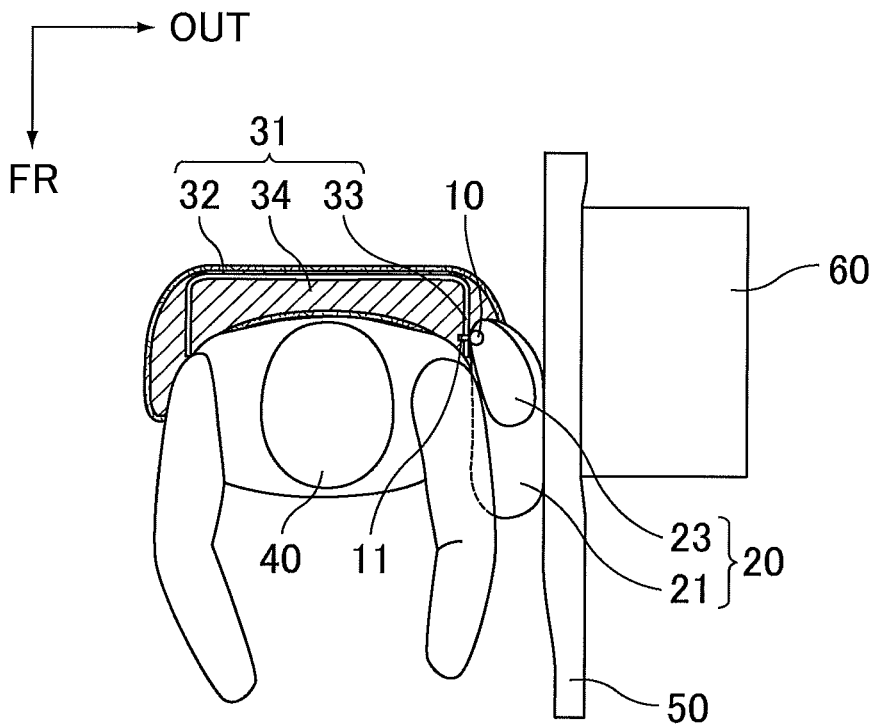
Figure 3A:
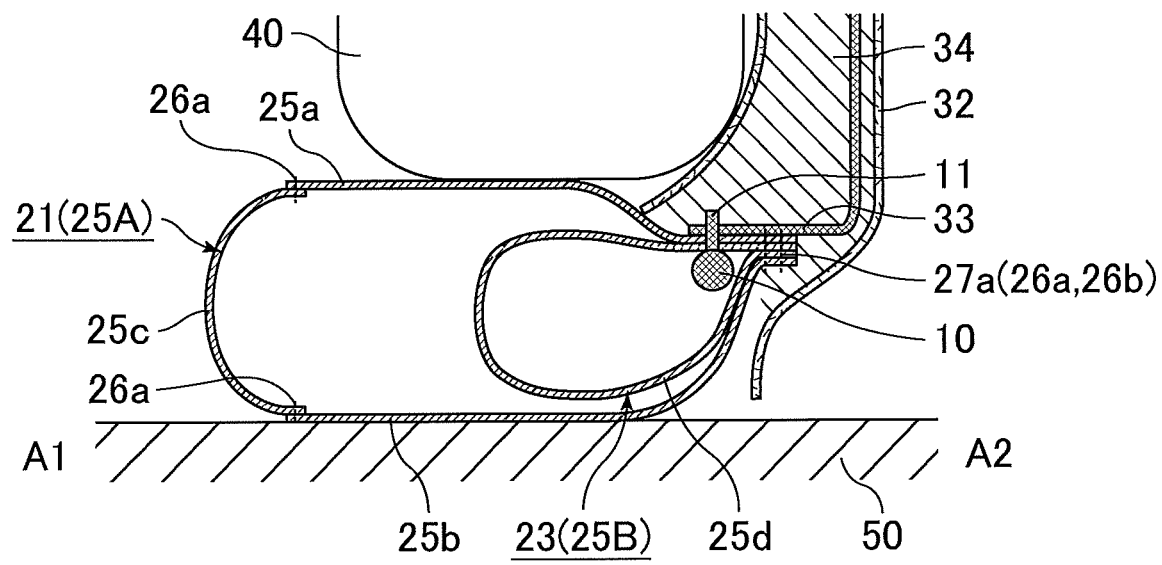
FIGS. 3A and 3B are schematic cross-sectional views taken along the lines in FIG. 2A.
Figure 3B:
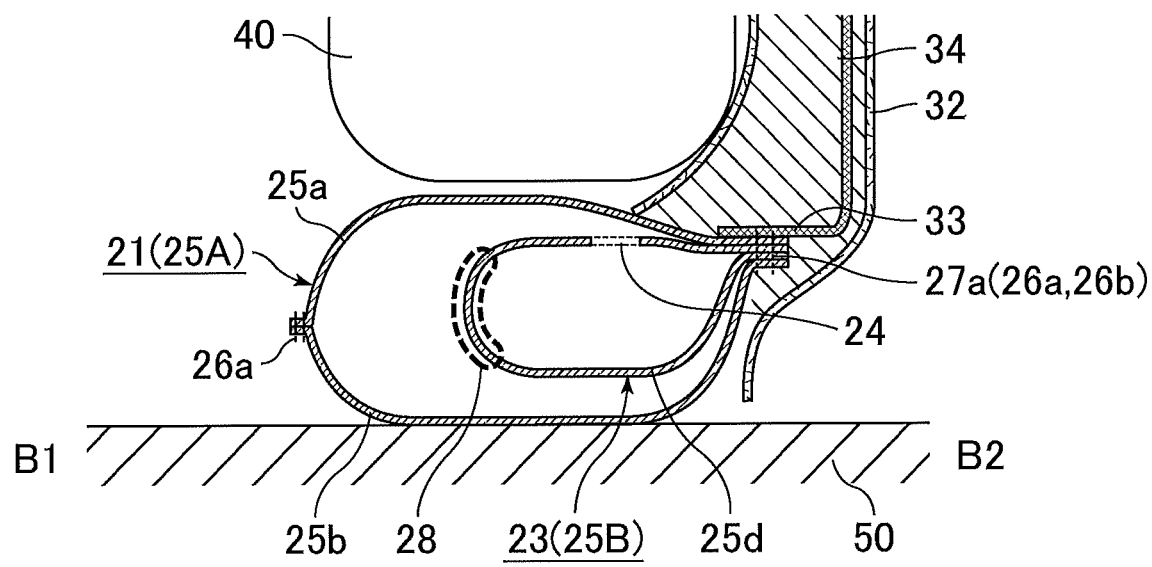

FIGS. 2A and 2B are schematic views of the side airbag device of Embodiment 1 in an early stage of occupant restriction by the side airbag; FIG. 2A shows a state seen from an outer side and FIG. 2B shows a state seen from an upper side. FIGS. 3A and 3B are schematic cross-sectional views taken along the lines in FIG. 2A; FIG. 3A is a cross-sectional view taken along the line A1-A2 and FIG. 3B is a cross-sectional view taken along the line B1-B2.

When a vehicle has a lateral collision with an obstruction 60 (e.g., another vehicle) and the inflator 10 is activated, the gas generated by the inflator 10 is introduced into the side airbag 20 and the side airbag 20 inflates while unfolded. The force applied from the inflated side airbag 20 then tears open the outer layer 32 of the seatback 31. Thereby, as shown in FIGS. 2A and 2B, the side airbag 20 inflates and deploys (full deployment) in the lateral space between the vehicle sidewall 50 and the occupant 40. FIGS. 2A and 2B schematically illustrate the state 5 to 15 ms after the start of activation of the inflator 10.

The side airbag 20 includes an outer bag 21 and an inner bag 23 that houses the inflator 10 and is disposed at a rear portion of the outer bag 21 along the extending direction (height direction) of the seatback 31. The outer bag 21 is provided with a vent hole 22 configured to communicate with the outside of the side airbag 20. The inner bag 23 is provided with a gas circulating hole 24 configured to communicate with the outer bag 21. The outer bag 21 and the inner bag 23 before inflation and deployment are folded together and attached on the side frame 33 placed on the side portion of the seatback 31.

In the present embodiment, the side airbag 20 has the aforementioned structure. Thus, when a vehicle has a lateral collision with the obstruction 60 and the inflator 10 is activated, the gas generated by the inflator 10 is first introduced into the inner bag 23 and the inner bag 23 inflates while unfolded. Simultaneously, the gas is introduced into the outer bag 21 through the gas circulating hole 24 provided for the inner bag 23 and the outer bag 21 inflates while unfolded. The force applied from the inflated outer bag 21 then tears open the outer layer 32 of the seatback 31. Thereby, the side airbag 20 inflates and deploys in the lateral space between the occupant 40 seated in the vehicle seat 30 and the vehicle sidewall 50 deformed due to the lateral collision and displaced toward the occupant 40, i.e., at the vehicle sidewall 50 side of the occupant 40. As a result, as shown in FIGS. 2A and 2B, the inflated and deployed side airbag 20 is placed so as to overlap the side faces (side faces on the vehicle sidewall 50 side) of the chest 41 and the back 45 of the occupant 40, protecting the side portions of the occupant 40.

In the early stage of occupant restriction by the side airbag 20 (the period from the beginning of inflation and deployment to the full deployment of the side airbag 20) as mentioned above, the inner bag 23 is disposed at a rear portion of the outer bag 21. The thickness of the inflated outer bag 21 in the width direction of the vehicle thus becomes greater than the thickness of the inflated inner bag 23 in the width direction of the vehicle. As shown in FIG. 3B, this generates a space between the gas circulating hole 24 provided for the inner bag 23 and the outer bag 21, and the gas can flow from the inner bag 23 to the outer bag 21 without hindrance, so that the outer bag 21 can inflate and deploy without hindrance. Accordingly, in the early stage of occupant restriction, the outer bag 21, which inflates while unfolded so that it can avoid an excessive increase in the inner pressure and can be soft, is capable of protecting the whole torso (including the chest 41 and the back 45) of the occupant 40.

When the outer bag 21 inflates and deploys, the gas generated from the inflator 10 is introduced from the inner bag 23 into the outer bag 21 through the gas circulating hole 24, while the gas inside the outer bag 21 is exhausted to the outside of the side airbag 20 through the vent hole 22. Thus, in order to adjust the amount of gas introduced into the outer bag 21 to be greater than the amount of gas exhausted from the outer bag 21 to surely inflate and deploy the outer bag 21, the gas circulating hole 24 preferably has a larger opening area than the vent hole 22, as shown in FIG. 2A.

Figure 4:
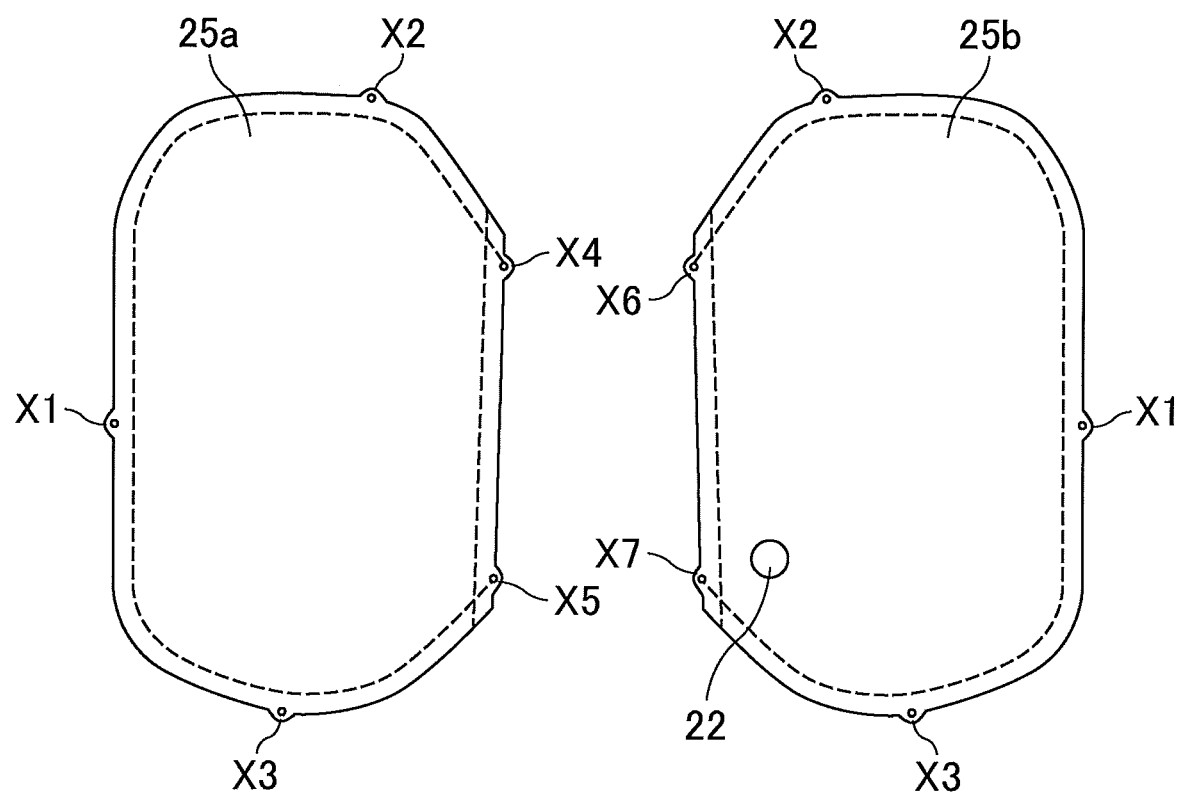
FIG. 4 is a schematic plan view of a base fabric piece composing an outer base fabric piece shown in FIGS. 2A, 3A, and 3B.

As shown in FIGS. 3A and 3B (FIG. 2A), the outer bag 21 is made from an outer base fabric piece 25A. The outer base fabric piece 25A has a bag shape prepared by joining base fabric pieces 25a, 25b, and 25c as shown in FIG. 4 along a peripheral joint portion 26a such that marks X1 to X7 are joined to the respective identical marks. FIG. 4 is a schematic plan view of a base fabric piece composing an outer base fabric piece shown in FIGS. 2A, 3A, and 3B. The outer base fabric piece 25A in the form of a bag may be prepared by joining the peripheral portion of a single base fabric piece in a single-folded state.

As shown in FIGS. 3A and 3B (FIG. 2A), the inner bag 23 is made from an inner base fabric piece 25B. The inner base fabric piece 25B has a bag shape prepared by single-folding a base fabric piece 25d as shown in FIG. 5 and joining the periphery along a peripheral joint portion 26b such that the marks Y1 to Y3 are joined to the respective identical marks. FIG. 5 is a schematic plan view of a base fabric piece composing an inner base fabric piece shown in FIGS. 2A, 3A, and 3B. The inner base fabric piece 25B in the form of a bag may be prepared by joining a plurality of base fabric pieces along the peripheral portions thereof.

As shown in FIGS. 3A and 3B (FIG. 2A), the inner bag 23 is made from a bag-shaped inner base fabric piece 25B that is disposed inside the outer bag 21 and includes an edge (peripheral portion) joined together with part of an edge (peripheral portion) of the outer base fabric piece 25A composing the outer bag 21. Specifically, as shown in FIGS. 4 and 5, part of the edge of the outer base fabric piece 25A composed by the base fabric pieces 25a, 25b, and 25c and the edge of the inner base fabric piece 25B composed by the base fabric piece 25d are joined at a joint portion 27a (that also functions as part of the peripheral joint portion 26a and the peripheral joint portion 26b) such that the marks X1 and the corresponding marks Y1 superimpose on each other, the marks X2 and the corresponding marks Y2 superimpose on each other, and the marks X3 and the corresponding marks Y3 superimpose on each other. This provides a state in which the inner bag 23 is disposed at a rear portion inside the outer bag 21. The peripheral joint portion 26a and the joint portion 27a define the peripheral shape of the outer bag 21 in an inflated and deployed state. The peripheral joint portion 26b and the joint portion 27a define the outer shape of the inner bag 23 in an inflated and deployed state thereof.

The base fabric pieces 25a, 25b, 25c, and 25d used may be pieces of cloth formed by weaving yarn such as yarn of nylon 66 or yarn of polyethylene terephthalate (PET). In order to improve the heat resistance and the airtightness, the surfaces of the base fabric pieces 25a, 25b, 25c, and 25d may be coated with an inorganic substance such as silicon.

The joining in formation of the outer bag 21 and the inner bag 23 may be performed by any technique, such as sewing, bonding, welding, or any combination thereof.

(Middle Stage of Occupant Restriction)

Figure 6A:
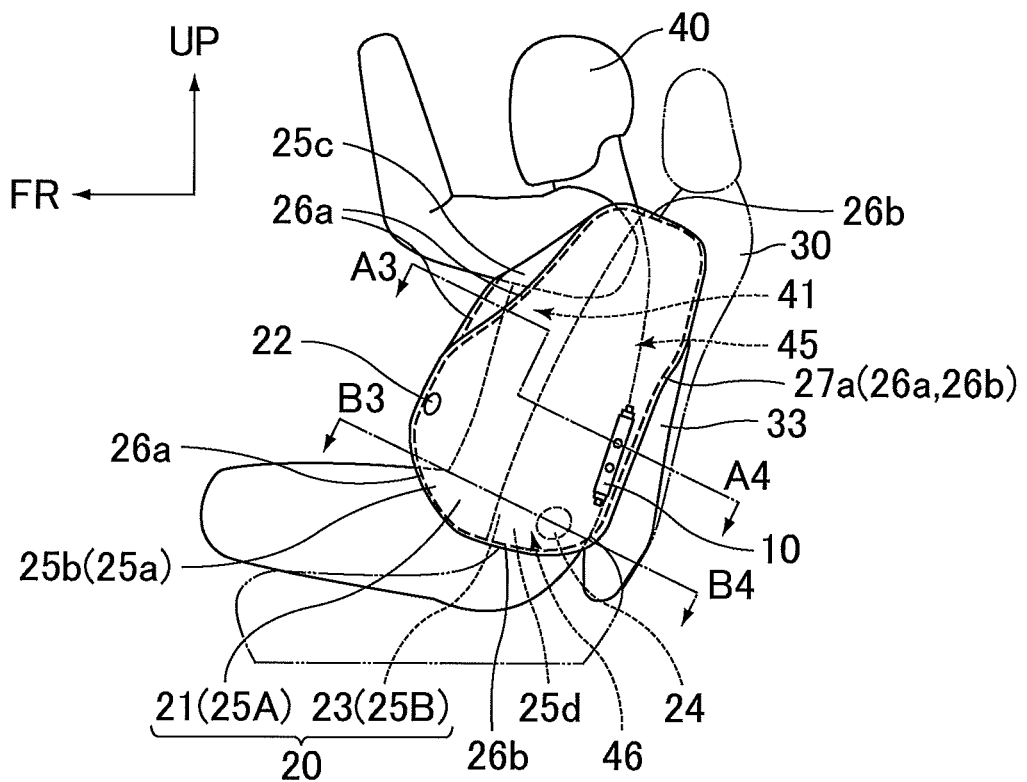
FIGS. 6A and 6B are schematic views of the side airbag device of Embodiment 1 in a middle stage of occupant restriction by the side airbag.
Figure 6B:
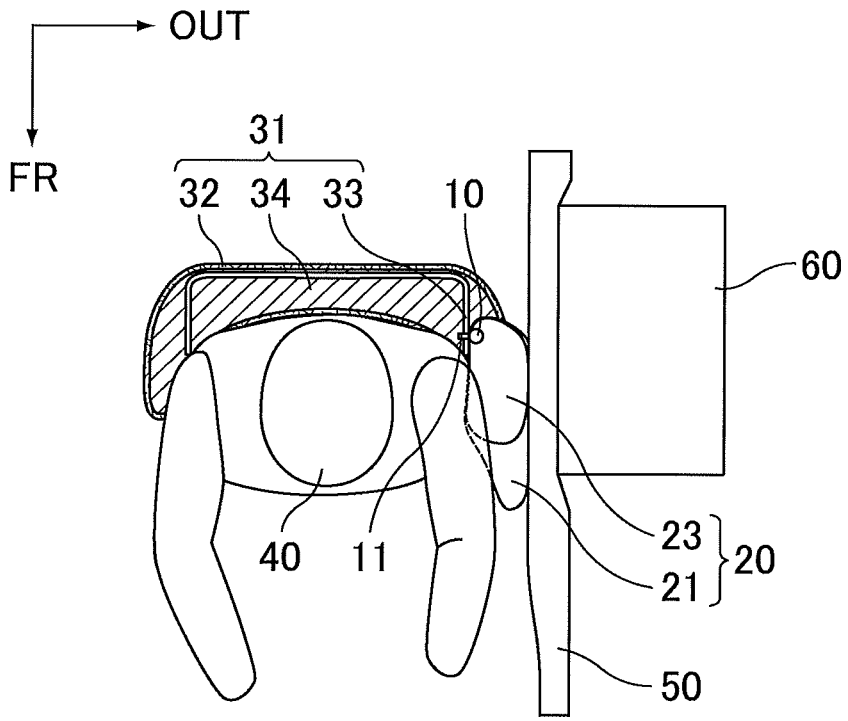
Figure 7A:
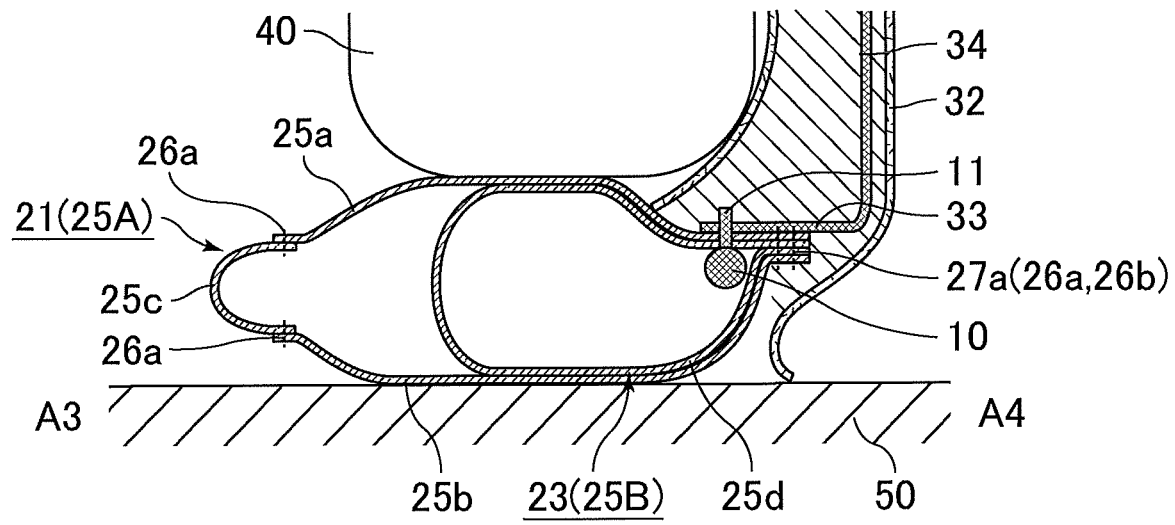
FIGS. 7A and 7B are schematic cross-sectional views taken along the lines in FIG. 6A.
Figure 7B:
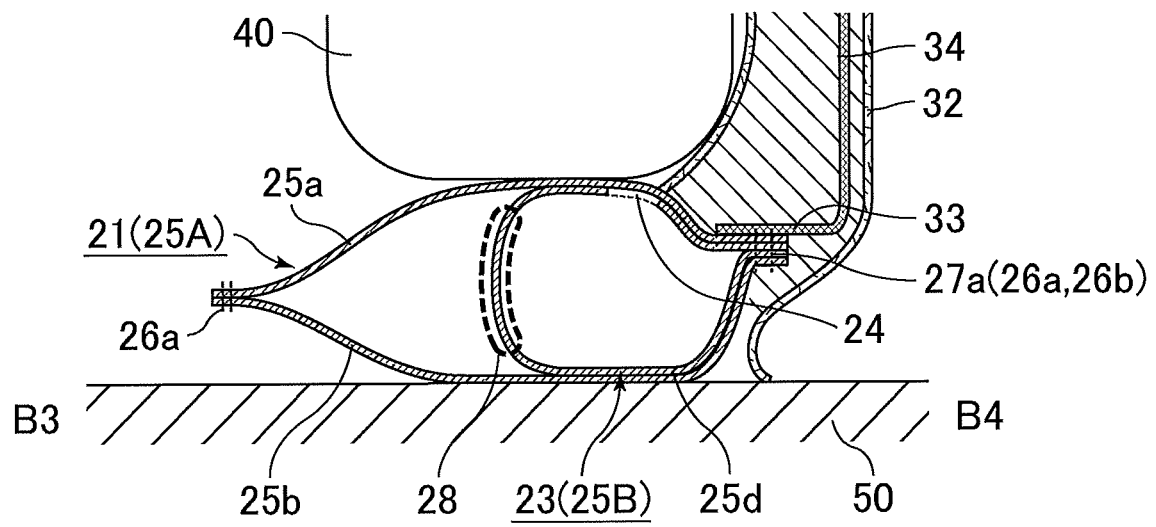

FIGS. 6A and 6B are schematic views of the side airbag device of Embodiment 1 in a middle stage of occupant restriction by the side airbag; FIG. 6A shows a state seen from an outer side and FIG. 6B shows a state seen from an upper side. FIGS. 7A and 7B are schematic cross-sectional views taken along the lines in FIG. 6A; FIG. 7A is a cross-sectional view taken along the line A3-A4 and FIG. 7B is a cross-sectional view taken along the line B3-B4. FIGS. 6A and 6B schematically illustrate the state 15 to 25 ms after the start of activation of the inflator 10.

As the displacement of the vehicle sidewall 50 due to the lateral collision increases and the space between the occupant 40 and the vehicle sidewall 50 becomes smaller than the space shown in FIG. 2B, the outer bag 21 of the side airbag 20 in an inflated and deployed state is pressed between the occupant 40 and the vehicle sidewall 50, as shown in FIG. 6B. At this time, as shown in FIG. 7B, the pressed outer bag 21 blocks the gas circulating hole 24 provided for the inner bag 23. This inhibits the gas flow from the inner bag 23 to the outer bag 21, maintaining the inner pressure in the inner bag 23 at a high level. In contrast, the outer bag 21 is provided with the vent hole 22 configured to communicate with the outside of the side airbag 20. Thus, when the outer bag 21 is pressed, the gas inside the outer bag 21 is exhausted to the outside through the vent hole 22. This allows the outer bag 21 to be soft with an appropriately adjusted inner pressure.

Therefore, in the middle stage of occupant restriction by the side airbag 20, the inner bag 23 and the outer bag 21 cause a difference in inner pressure. The chest 41, which is a relatively weak portion of the torso of the occupant 40, is protected by the outer bag 21 in a soft state, while the back 45, which is a relatively tough portion of the torso of the occupant 40, is protected by the inner bag 23 with an inner pressure maintained at a high level. At this time, as shown in FIG. 6A, the inner bag 23 is disposed along the extending direction (height direction) of the seatback 31, i.e., along the back 45 of the occupant 40, and thus can surely protect the back 45.

The gas circulating hole 24 is disposed at a position to be blocked by the outer bag 21 when the side airbag 20 (outer bag 21) in an inflated and deployed state is pressed between the occupant 40 and the vehicle sidewall 50 after the lateral collision of the vehicle occurred. The term "position to be blocked by the outer bag 21" on the inner bag 23 means the position on the inner bag 23 to be in contact with the outer bag 21 when, in a lateral collision of a vehicle, the vehicle sidewall 50 protrudes into the vehicle and the side airbag 20 (outer bag 21) is pressed between the occupant 40 and the vehicle sidewall 50. For example, this position indicates a position other than a front portion 28 (portion facing a front portion of the outer bag 21) of the inner bag 23 as shown in FIG. 7B. The timing when the gas circulating hole 24 is blocked by the outer bag 21 may be 15 ms or more after the start of activation of the inflator 10, for example.

As shown in FIG. 6A and FIG. 7B, the gas circulating hole 24 is preferably disposed at a central portion or on a rear side relative to the central portion in the forward-backward direction of the inner bag 23. This easily brings the outer bag 21 close to the gas circulating hole 24 when the outer bag 21 is pressed, so that the outer bag 21 can efficiently block the gas circulating hole 24. The closer the gas circulating hole 24 is placed to the central portion of the inner bag 23, the more the gas easily flows from the inner bag 23 to the outer bag 21 in the early stage of occupant restriction (before the gas circulating hole 24 is blocked by the outer bag 21). As a result, the outer bag 21 inflates and deploys more rapidly at the vehicle sidewall 50 side of the occupant 40, so that the outer bag 21 can surely protect the occupant 40. In contrast, the closer the gas circulating hole 24 is placed to the rearmost portion of the inner bag 23, the more the gas circulating hole 24 is easily brought into contact with the outer bag 21 when the outer bag 21 is pressed in the middle stage of occupant restriction. Thereby, the outer bag 21 can more efficiently block the gas circulating hole 24.

As shown in FIG. 6A and FIG. 7B, the gas circulating hole 24 is preferably disposed at a lower portion of the inner bag 23. In this case, the gas circulating hole 24 is disposed near the hip 46 (including the side portion of the back 45 (the side portion on the vehicle sidewall 50 side)), of which the position is less likely to change due to the somatotype among the body regions of the torso of the occupant 40. Thereby, the outer bag 21 can surely block the gas circulating hole 24 regardless of the somatotype of the occupant 40 when the outer bag 21 is pressed.

As shown in FIG. 7B, the gas circulating hole 24 is preferably disposed on the occupant 40 side of the inner bag 23. The degree of pressing the outer bag 21 by the occupant 40 is less likely to differ among the positions. Thus, the gas circulating hole 24 disposed on the occupant 40 side of the inner bag 23 can sufficiently be brought into contact with the outer bag 21. Thereby, the outer bag 21 can surely block the gas circulating hole 24.

Figure 8A:
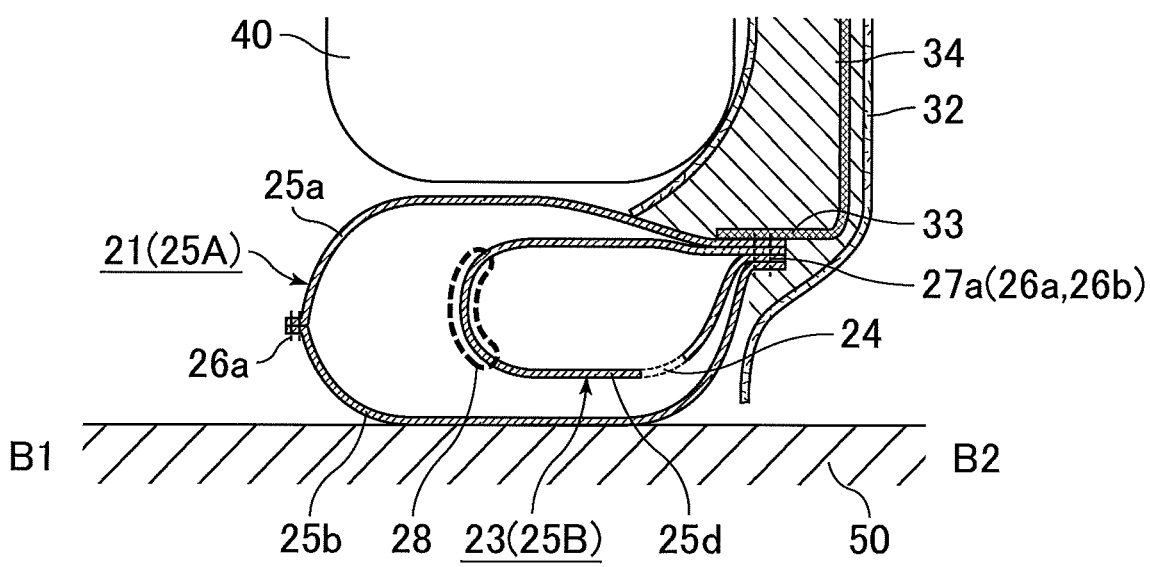
FIGS. 8A and 8B are schematic views of a side airbag device of Variation 1 of Embodiment 1 in occupant restriction by the side airbag.
Figure 8B:
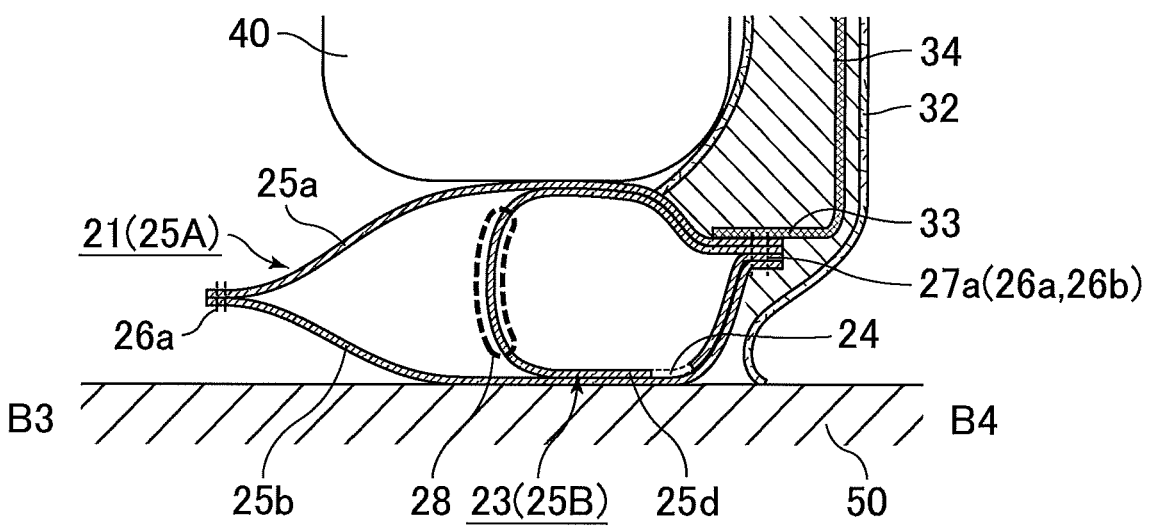

In Variation 1 of the present embodiment, the gas circulating hole 24 may be disposed on the vehicle sidewall 50 side of the inner bag 23. FIGS. 8A and 8B are schematic views of a side airbag device of Variation 1 of Embodiment 1 in occupant restriction by the side airbag; FIG. 8A is a cross-sectional view taken along the line B1-B2 in FIG. 2A in an early stage of occupant restriction and FIG. 8B is a cross-sectional view taken along the line B3-B4 in FIG. 6A in a middle stage of occupant restriction. Bumps may present on the occupant 40 side portion of the vehicle sidewall 50, and such bumps in some conditions may cause a significant difference in the degree of pressing the outer bag 21 by the vehicle sidewall 50 between positions. In contrast, as the position of the gas circulating hole 24 is adjusted so as to face a flat portion (a portion with less bumps) of the vehicle sidewall 50 when the outer bag 21 is pressed, the outer bag 21 can surely block the gas circulating hole 24 in the middle stage of occupant restriction even when the gas circulating hole 24 is disposed on the vehicle sidewall 50 side of the inner bag 23 as in the case of the present variation.

A plurality of gas circulating holes 24 may be provided. This can increase the amount of gas flowing from the inner bag 23 to the outer bag 21 in the early stage of occupant restriction, resulting in more rapid inflation and deployment of the outer bag 21 in the lateral space between the vehicle sidewall 50 and the side portion of the occupant 40. Thereby, the outer bag 21 can surely protect the occupant 40.

Figure 9A:
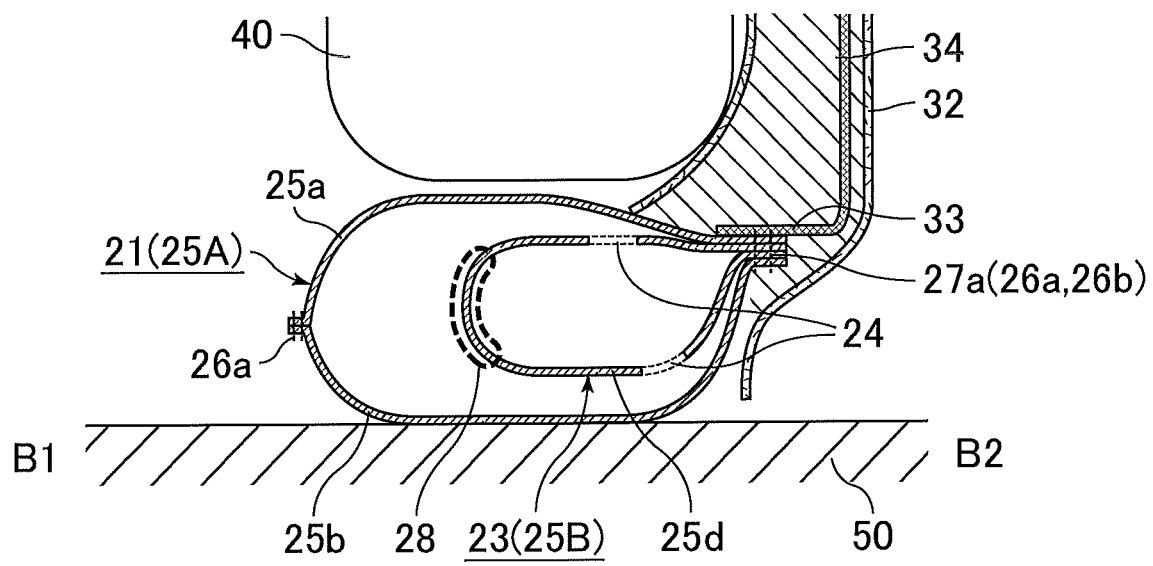
FIGS. 9A and 9B are schematic views of a side airbag device of Variation 2 of Embodiment 1 in occupant restriction by the side airbag.
Figure 9B:
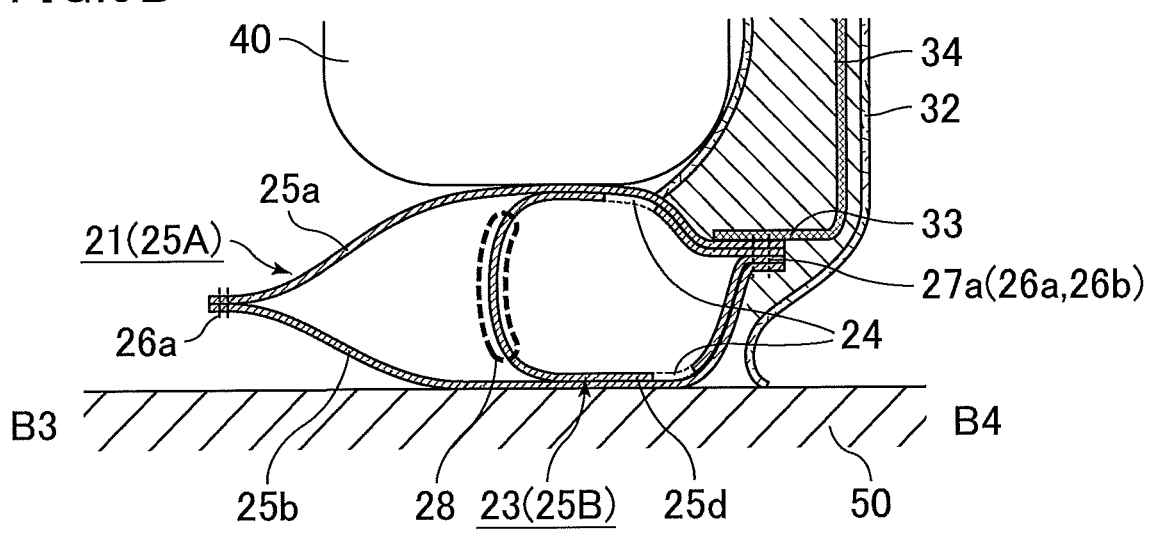

In Variation 2 of the present embodiment, for example, the gas circulating hole 24 may be disposed on each of the occupant 40 side and the vehicle sidewall 50 side of the inner bag 23. FIGS. 9A and 9B are schematic views of a side airbag device of Variation 2 of Embodiment 1 in occupant restriction by the side airbag; FIG. 9A is a cross-sectional view taken along the line B1-B2 in FIG. 2A in an early stage of occupant restriction and FIG. 9B is a cross-sectional view taken along the line B3-B4 in FIG. 6A in a middle stage of occupant restriction. In the present variation, in the middle stage of occupant restriction, the outer bag 21 can block the gas circulating holes 24. The opening area of the gas circulating hole 24 disposed on the occupant 40 side of the inner bag 23 and the opening area of the gas circulating hole 24 disposed on the vehicle sidewall 50 side of the inner bag 23 may be the same as or different from each other.

The gas circulating hole 24 may have any shape, and preferably has a circular shape as shown in FIG. 6A.

(Late Stage of Occupant Restriction)

Figure 10A:
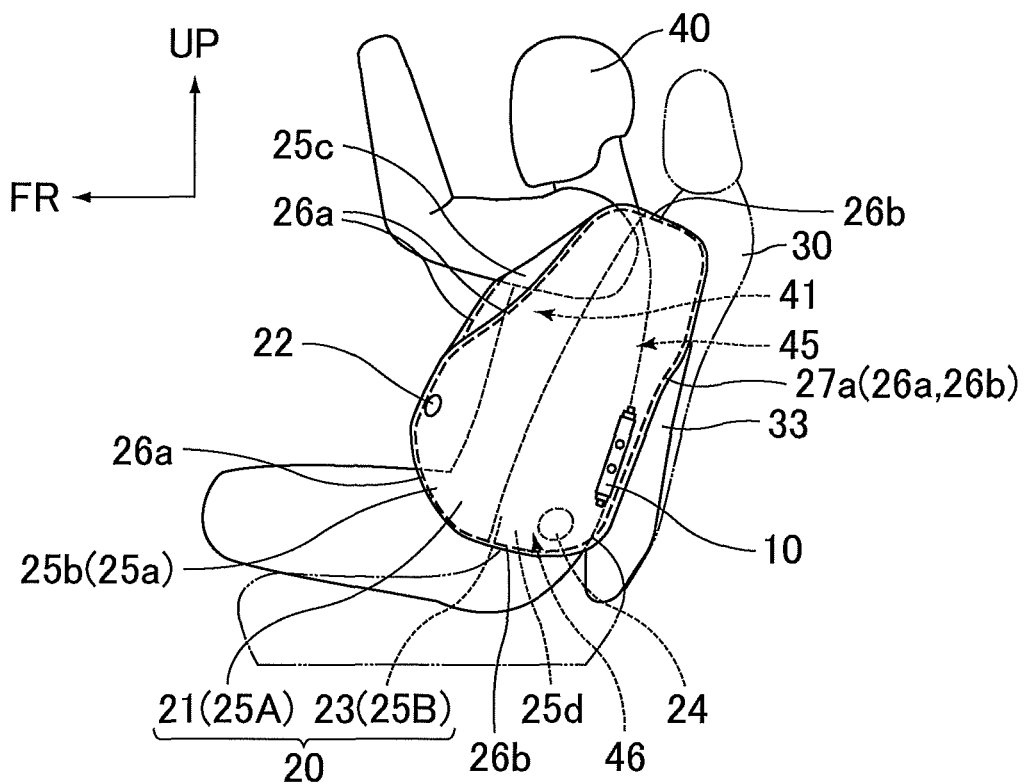
FIGS. 10A and 10B are schematic views of the side airbag device of Embodiment 1 in a late stage of occupant restriction by the side airbag.
Figure 10B:
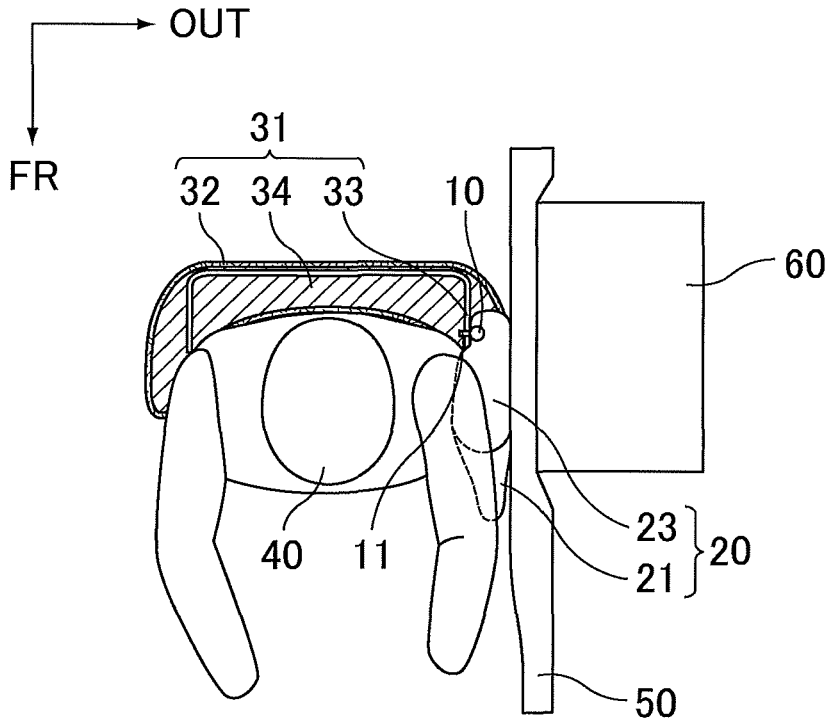

FIGS. 10A and 10B are schematic views of the side airbag device of Embodiment 1 in a late stage of occupant restriction by the side airbag; FIG. 10A shows a state seen from an outer side and FIG. 10B shows a state seen from an upper side. FIGS. 10A and 10B schematically illustrate the state 40 ms after the start of activation of the inflator 10.

As the displacement of the vehicle sidewall 50 due to the lateral collision further increases and the space between the occupant 40 and the vehicle sidewall 50 becomes smaller than the space shown in FIG. 6B, the outer bag 21 is further pressed between the occupant 40 and the vehicle sidewall 50, as shown in FIG. 10B. At this time, similar to the middle stage of occupant restriction, the gas circulating hole 24 remains blocked by the pressed outer bag 21. This continues to inhibit the gas flow from the inner bag 23 to the outer bag 21, maintaining the inner pressure in the inner bag 23 at a high level. In contrast, when the outer bag 21 is more pressed than the state shown in FIG. 6B, the gas inside the outer bag 21 is further exhausted to the outside of the side airbag 20 through the vent hole 22. This allows the outer bag 21 to maintain its soft state.

Therefore, also in the late stage of occupant restriction by the side airbag 20, similar to the middle stage of occupant restriction, the inner bag 23 and the outer bag 21 cause a difference in inner pressure. The chest 41, which is a relatively weak portion of the torso of the occupant 40, is protected by the outer bag 21 in a soft state, while the back 45, which is a relatively tough portion of the torso of the occupant 40, is protected by the inner bag 23 with an inner pressure maintained at a high level.

As described above, in the present embodiment, the gas circulating hole 24 provided for the inner bag 23 is blocked by the pressed outer bag 21 during restriction of the occupant 40 by the side airbag 20 in a lateral collision of a vehicle, so that the inner pressure in the inner bag 23 is maintained at a high level for a long period of time. Thereby, the side airbag 20 (especially, the inner bag 23) can absorb an impact energy from the vehicle sidewall 50 even at a high lateral collision speed of the vehicle and a high impact energy thereof. In contrast, the inner bag 23 is disposed along the extending direction (height direction) of the seatback 31, i.e., along the back 45 of the occupant 40, so that the reaction force from the side airbag 20 (inner bag 23) is received by the back 45, which is a relatively tough portion, of the torso of the occupant 40. Thereby, no large impact is applied to the chest 41, which is a relatively weak portion, of the torso of the occupant 40, and the occupant 40 can be protected appropriately.

The other components of the side airbag device 1 to be used may be similar to components of conventionally known side airbag devices as appropriate.

Embodiment 2

A side airbag device of Embodiment 2 is described below with reference to the drawings, with the inflating and deploying behavior of the side airbag being focused on. The side airbag device of Embodiment 2 is similar to the side airbag device of Embodiment 1, except for the structure of the inner bag. The same features therefore will not be elaborated upon here.

(Before Inflation and Deployment)

The side airbag 20 before inflation and deployment is similar to that described with reference to FIG. 1.

(Early Stage of Occupant Restriction)

Figure 11A:
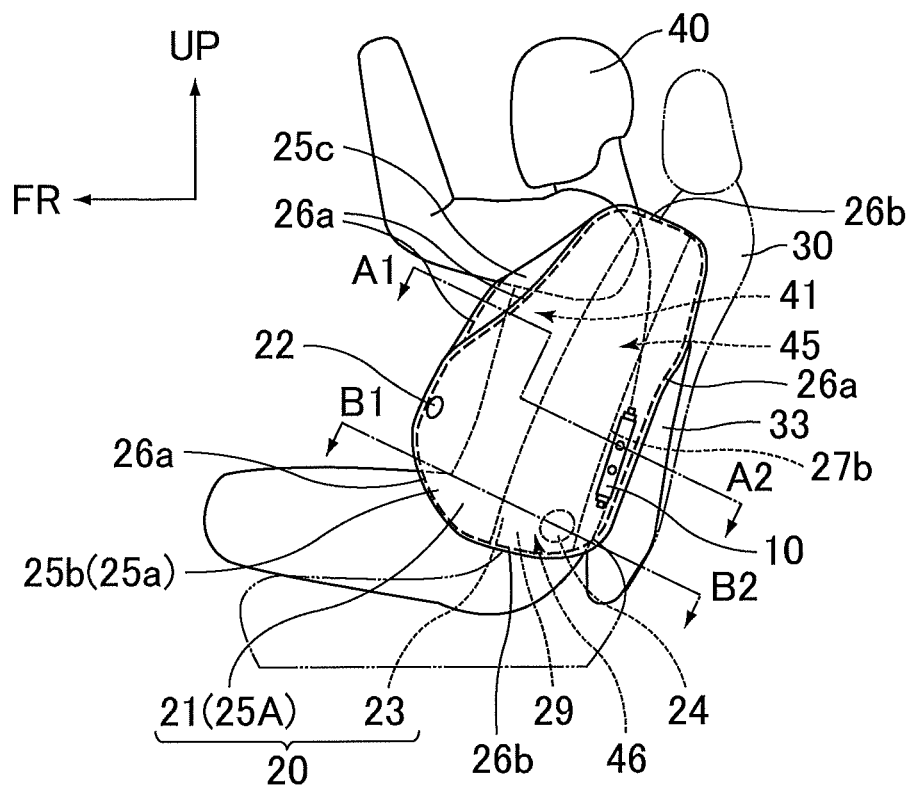
FIGS. 11A and 11B are schematic views of a side airbag device of Embodiment 2 in an early stage of occupant restriction by the side airbag.
Figure 11B:
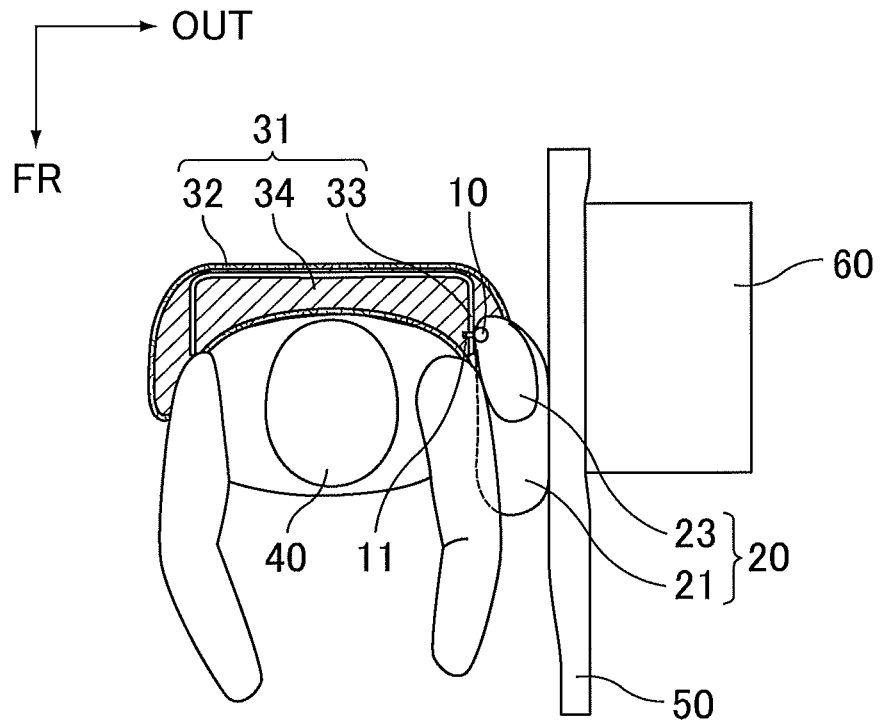
Figure 12A:
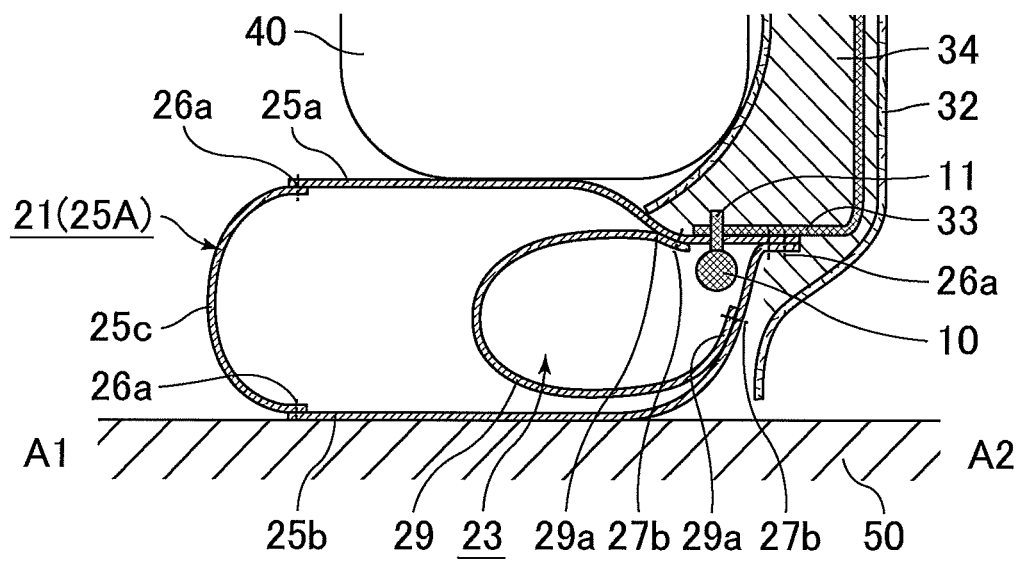
FIGS. 12A and 12B are schematic cross-sectional views taken along the lines in FIG. 11A.
Figure 12B:
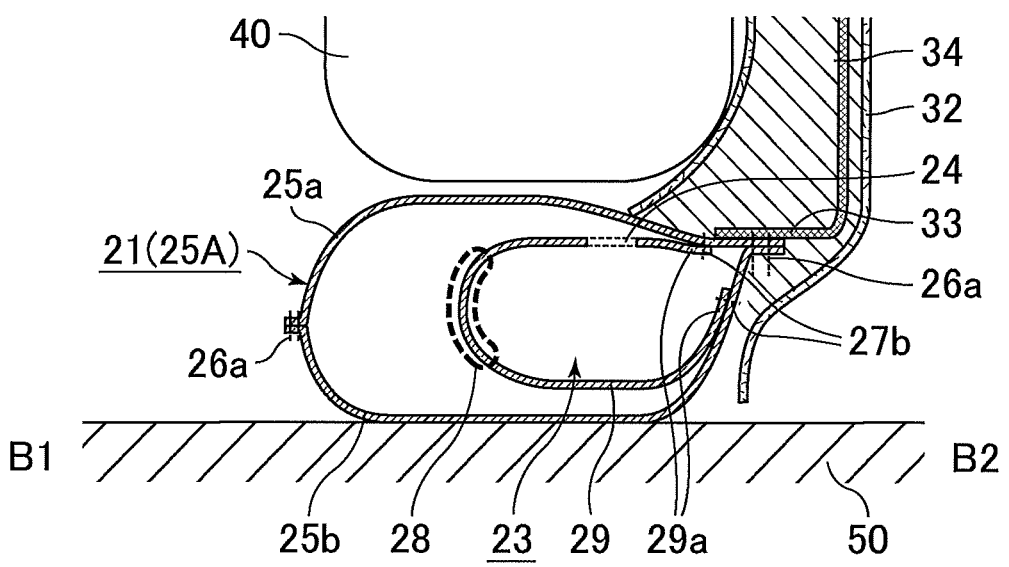

FIGS. 11A and 11B are schematic views of the side airbag device of Embodiment 2 in an early stage of occupant restriction by the side airbag; FIG. 11A shows a state seen from an outer side and FIG. 11B shows a state seen from an upper side. FIGS. 12A and 12B are schematic cross-sectional views taken along the lines in FIG. 11A; FIG. 12A is a cross-sectional view taken along the line A1-A2 and FIG. 12B is a cross-sectional view taken along the line B1-B2.

When a vehicle has a lateral collision with the obstruction 60 (e.g., another vehicle) and the inflator 10 is activated, the gas generated by the inflator 10 is introduced into the side airbag 20 and the side airbag 20 inflates while unfolded. The force applied from the inflated side airbag 20 then tears open the outer layer 32 of the seatback 31. Thereby, as shown in FIGS. 11A and 11B, the side airbag 20 inflates and deploys (full deployment) in the lateral space between the vehicle sidewall 50 and a side portion of the occupant 40. Accordingly, in the early stage of occupant restriction, the outer bag 21, which is inflated while unfolded so that it can avoid an excessive increase in the inner pressure and can be soft, is capable of protecting the whole torso (including the chest 41 and the back 45) of the occupant 40.

As shown in FIGS. 12A and 12B (FIG. 11A), the outer bag 21 is made from the outer base fabric piece 25A. The outer base fabric piece 25A has a bag shape prepared by joining the base fabric pieces 25a, 25b, and 25c as shown in FIG. 4 along the peripheral joint portion 26a such that the marks X1 to X7 are joined to the respective identical marks. The outer base fabric piece 25A in the form of a bag may be prepared by joining the peripheral portion of a single base fabric piece in a single-folded state.

Figure 13:
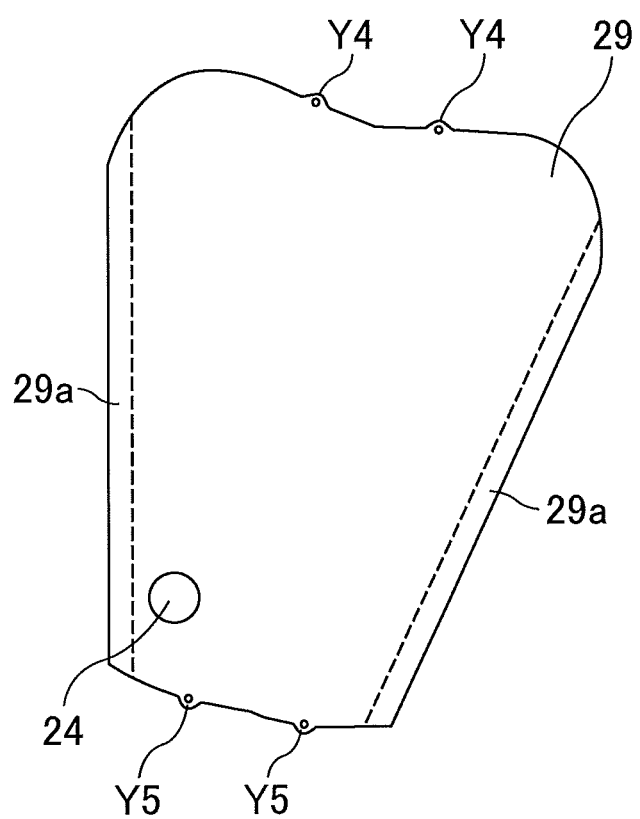
FIG. 13 is a schematic plan view of a partition base fabric piece shown in FIGS. 11A, 12A, and 12B.

As shown in FIGS. 12A and 12B (FIG. 11A), the inner bag 23 is made from a base fabric piece that composes a region defined by part of the outer base fabric piece 25A composing the outer bag 21 and a partition base fabric piece 29 joined to the outer base fabric piece 25A so as to partition a space inside the outer bag 21. Specifically, each edge 29a of the partition base fabric piece 29 as shown in FIG. 13 is joined to portions other than the edges of the outer base fabric piece 25A composed by the base fabric pieces 25a, 25b, and 25c at joint portions 27b so as to partition a space inside the outer bag 21. FIG. 13 is a schematic plan view of a partition base fabric piece shown in FIGS. 11A, 12A, and 12B. The edges (peripheral portions) of the partition base fabric piece 29 other than the edges 29a and part of the edge of the outer base fabric piece 25A composed by the base fabric pieces 25a, 25b, and 25c are joined at peripheral joint portions 26b (that also function as part of the peripheral joint portions 26a) such that the marks X2 and the corresponding marks Y4 superimpose on each other and the marks X3 and the corresponding marks Y5 superimpose on each other. This provides the inner bag 23 made from the base fabric piece that composes a region defined by part of the base fabric pieces 25a and 25b composing the outer base fabric piece 25A and the partition base fabric piece 29.

The partition base fabric piece 29 used may be a piece of cloth formed by weaving yarn such as yarn of nylon 66 or yarn of polyethylene terephthalate (PET). In order to improve the heat resistance and the airtightness, the surface of the partition base fabric piece 29 may be coated with an inorganic substance such as silicon.

(Middle Stage of Occupant Restriction)

Figure 14A:
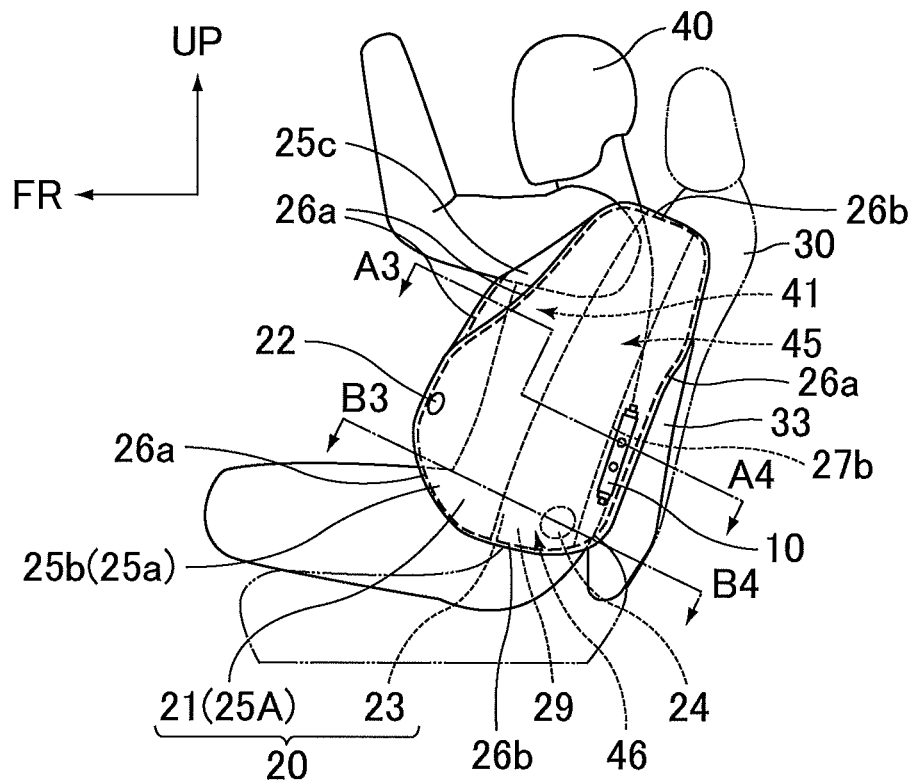
FIGS. 14A and 14B are schematic views of the side airbag device of Embodiment 2 in a middle stage of occupant restriction by the side airbag.
Figure 14B:
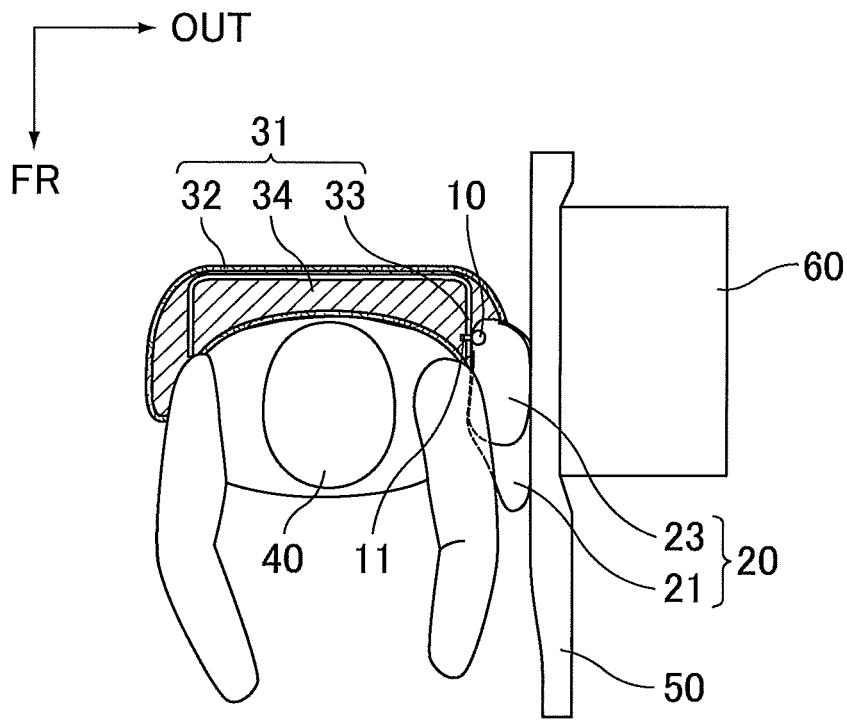
Figure 15A:
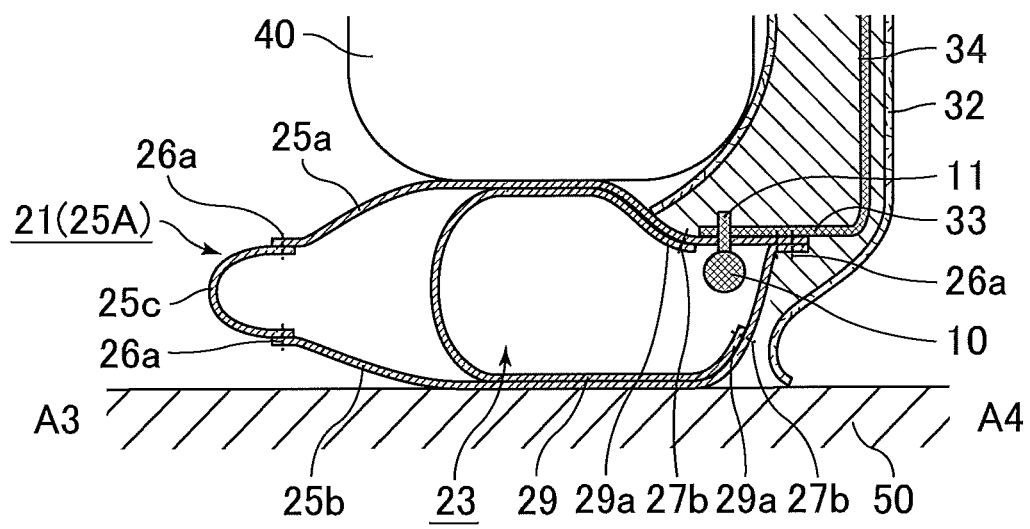
FIGS. 15A and 15B are schematic cross-sectional views taken along the lines in FIG. 14A.
Figure 15B:
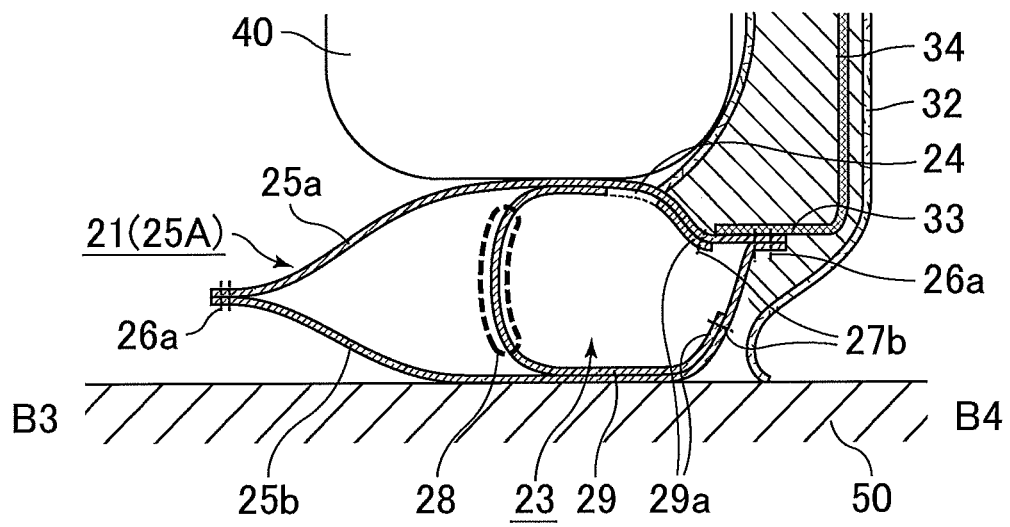

FIGS. 14A and 14B are schematic views of the side airbag device of Embodiment 2 in a middle stage of occupant restriction by the side airbag; FIG. 14A shows a state seen from an outer side and FIG. 14B shows a state seen from an upper side. FIGS. 15A and 15B are schematic cross-sectional views taken along the lines in FIG. 14A; FIG. 15A is a cross-sectional view taken along the line A3-A4 and FIG. 15B is a cross-sectional view taken along the line B3 B4.

As the displacement of the vehicle sidewall 50 due to the lateral collision increases and the space between the occupant 40 and the vehicle sidewall 50 becomes smaller than the space shown in FIG. 11B, the outer bag 21 of the side airbag 20 in an inflated and deployed state is pressed between the occupant 40 and the vehicle sidewall 50, as shown in FIG. 14B. At this time, as shown in FIG. 15B, the pressed outer bag 21 blocks the gas circulating hole 24 provided for the inner bag 23. This inhibits the gas flow from the inner bag 23 to the outer bag 21, maintaining the inner pressure in the inner bag 23 at a high level. In contrast, the outer bag 21 is provided with the vent hole 22 configured to communicate with the outside of the side airbag 20. Thus, when the outer bag 21 is pressed, the gas inside the outer bag 21 is exhausted to the outside through the vent hole 22. This allows the outer bag 21 to be soft with an appropriately adjusted inner pressure.

Therefore, in the middle stage of occupant restriction by the side airbag 20, the inner bag 23 and the outer bag 21 cause a difference in inner pressure. The chest 41, which is a relatively weak portion of the torso of the occupant 40, is protected by the outer bag 21 in a soft state, while the back 45, which is a relatively tough portion of the torso of the occupant 40, is protected by the inner bag 23 with an inner pressure maintained at a high level. At this time, as shown in FIG. 14A, the inner bag 23 is disposed along the extending direction (height direction) of the seatback 31, i.e., along the back 45 of the occupant 40, and thus can surely protect the back 45.

As shown in FIG. 15B, the gas circulating hole 24 is preferably disposed on the occupant 40 side of the inner bag 23. The gas circulating hole 24 may be disposed on the vehicle sidewall 50 side of the inner bag 23, or may be disposed on each of the occupant 40 side and the vehicle sidewall 50 side of the inner bag 23.

(Late Stage of Occupant Restriction)

Figure 16A:
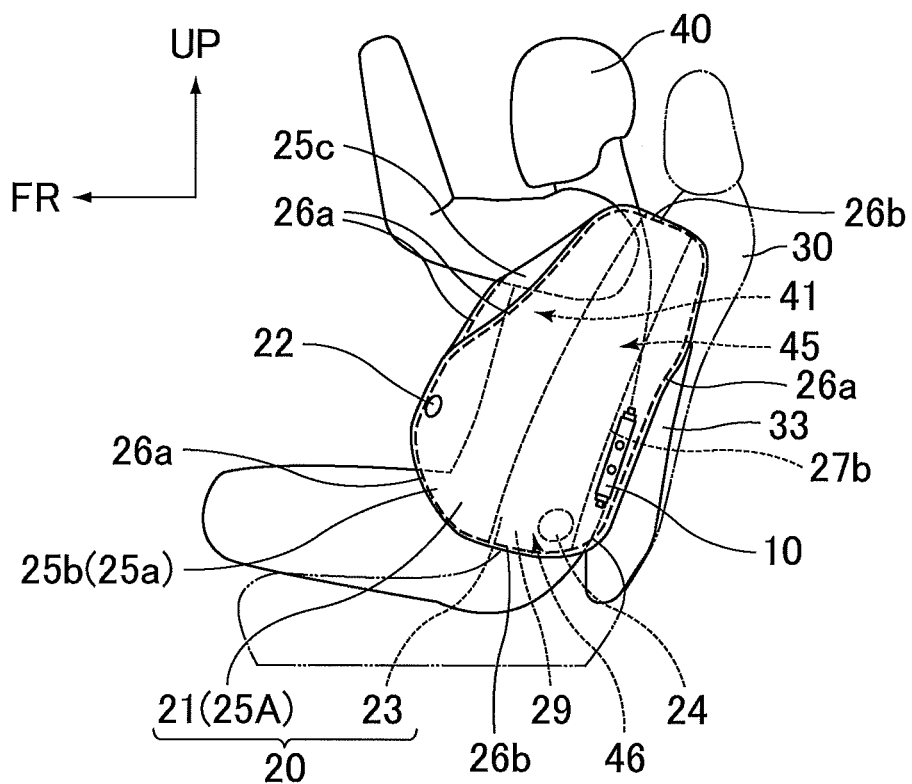
FIGS. 16A and 16B are schematic views of the side airbag device of Embodiment 2 in a late stage of occupant restriction by the side airbag.
Figure 16B:
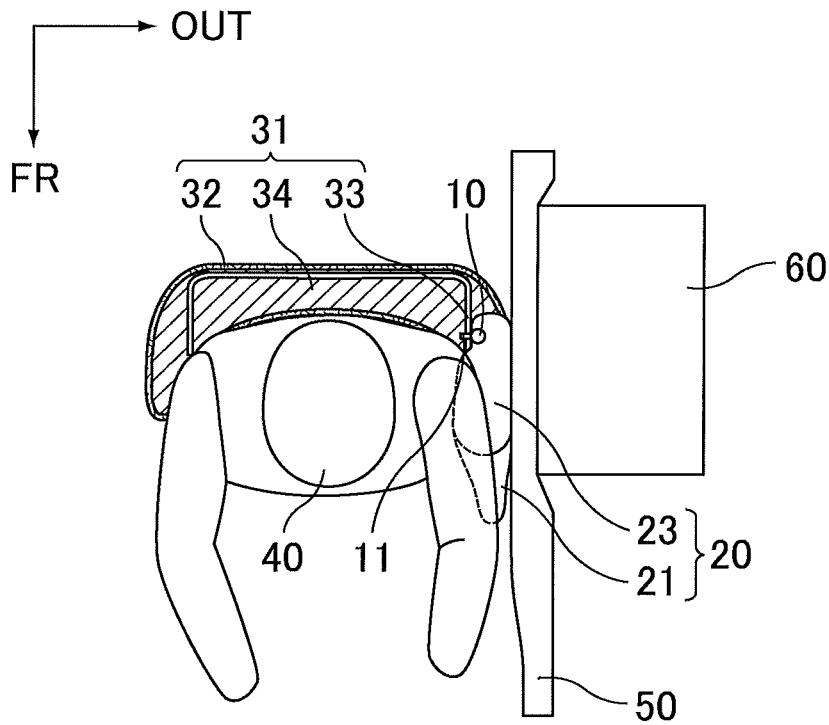

FIGS. 16A and 16B are schematic views of the side airbag device of Embodiment 2 in a late stage of occupant restriction by the side airbag; FIG. 16A shows a state seen from an outer side and FIG. 16B shows a state seen from an upper side.

As the displacement of the vehicle sidewall 50 due to the lateral collision further increases and the space between the occupant 40 and the vehicle sidewall 50 becomes smaller than the space shown in FIG. 14B, the outer bag 21 is further pressed between the occupant 40 and the vehicle sidewall 50, as shown in FIG. 16B. At this time, similar to the middle stage of occupant restriction, the gas circulating hole 24 remains blocked by the pressed outer bag 21. This continues to inhibit the gas flow from the inner bag 23 to the outer bag 21, maintaining the inner pressure in the inner bag 23 at a high level. In contrast, when the outer bag 21 is more pressed than the state shown in FIG. 14B, the gas inside the outer bag 21 is further exhausted to the outside through the vent hole 22. This allows the outer bag 21 to maintain its soft state.

Therefore, also in the late stage of occupant restriction by the side airbag 20, similar to the middle stage of occupant restriction, the inner bag 23 and the outer bag 21 cause a difference in inner pressure. The chest 41, which is a relatively weak portion of the torso of the occupant 40, is protected by the outer bag 21 in a soft state, while the back 45, which is a relatively tough portion of the torso of the occupant 40, is protected by the inner bag 23 with an inner pressure maintained at a high level.

As described above, also in the present embodiment, the gas circulating hole 24 provided for the inner bag 23 is blocked by the pressed outer bag 21 during restriction of the occupant 40 by the side airbag 20 in a lateral collision of a vehicle, so that the inner pressure in the inner bag 23 is maintained at a high level for a long period of time. Thereby, the side airbag 20 (especially, the inner bag 23) can absorb an impact energy from the vehicle sidewall 50 even at a high lateral collision speed of the vehicle and a high impact energy thereof. In contrast, the inner bag 23 is disposed along the extending direction (height direction) of the seatback 31, i.e., along the back 45 of the occupant 40, so that the reaction force from the side airbag 20 (inner bag 23) is received by the back 45, which is a relatively tough portion, of the torso of the occupant 40. Thereby, no large impact is applied to the chest 41, which is a relatively weak portion, of the torso of the occupant 40, and the occupant 40 can be protected appropriately.

Embodiment 3

A side airbag device of Embodiment 3 is described below with reference to the drawings. The side airbag device of Embodiment 3 is similar to the side airbag device of Embodiment 1, except for the structure of the inner bag. The same features therefore will not be elaborated upon here.

Figure 17:
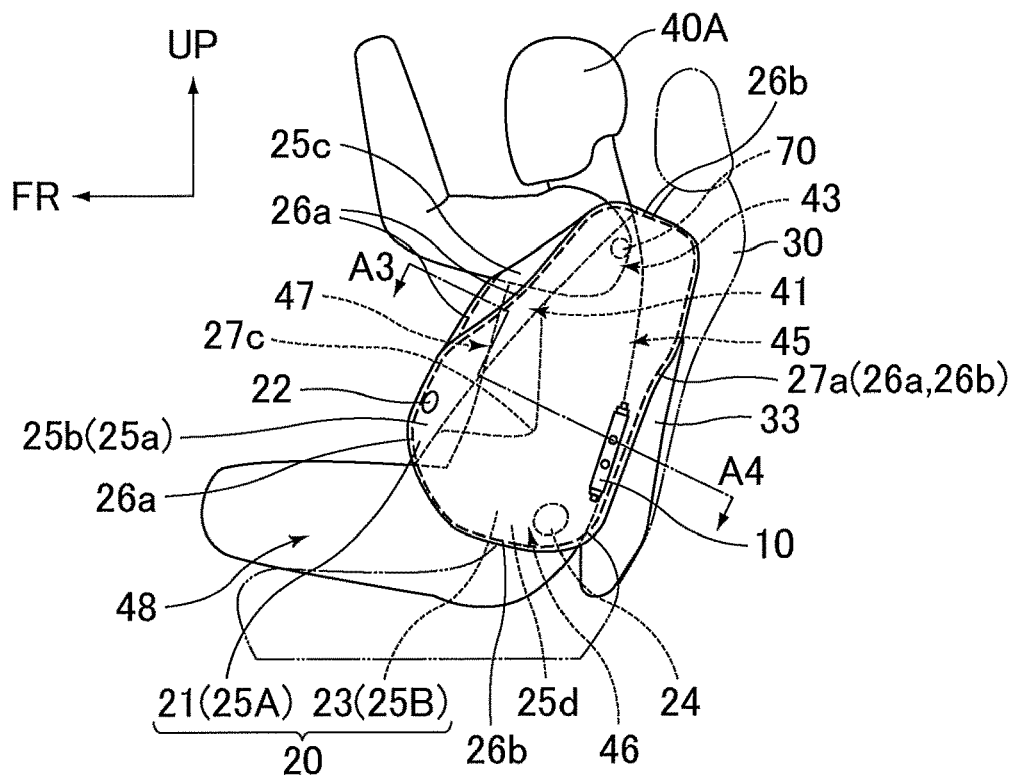
FIG. 17 is a schematic view of a side airbag device of Embodiment 3 in a middle stage of occupant restriction by the side airbag with a WS50-type world side impact dummy seated in a vehicle seat.
Figure 18:
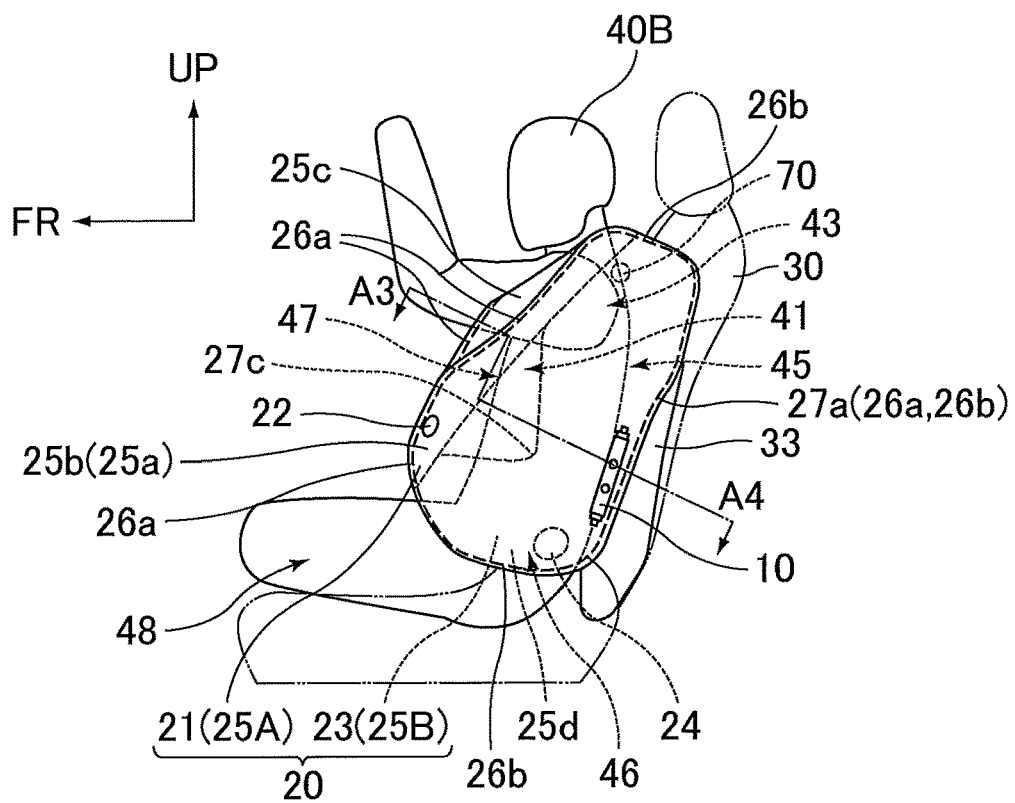
FIG. 18 is a schematic view of a side airbag device of Embodiment 3 in a middle stage of occupant restriction by the side airbag with a WS5-type world side impact dummy seated in a vehicle seat.

Hereinabove, the occupant 40 described is a world side impact dummy seated in the vehicle seat 30. Still, more specifically, a WS50-type world side impact dummy which simulates an occupant with a standard somatotype may be seated in the vehicle seat 30 in some cases, while a WS5-type world side impact dummy which simulates an occupant with a small somatotype may be seated in the vehicle seat 30 in other cases. FIG. 17 is a schematic view of a side airbag device of Embodiment 3 in a middle stage of occupant restriction by the side airbag with a WS50-type world side impact dummy seated in a vehicle seat. FIG. 18 is a schematic view of a side airbag device of Embodiment 3 in a middle stage of occupant restriction by the side airbag with a WS5-type world side impact dummy seated in a vehicle seat. FIGS. 17 and 18 are side views of the side airbag device of Embodiment 3.

As described above, in the middle stage of occupant restriction (and in the late stage of occupant restriction) by the side airbag 20, the pressed outer bag 21 blocks the gas circulating hole 24 provided for the inner bag 23. This inhibits the gas flow from the inner bag 23 to the outer bag 21, maintaining the inner pressure in the inner bag 23 at a high level. Thus, as shown in FIGS. 17 and 18, the back 45, which is a relatively tough portion of a torso 47, of each of the WS50-type world side impact dummy 40A and the WS5-type world side impact dummy 40B can be protected by the inner bag 23 with an inner pressure maintained at a high level. In this case, the size of the inner bag 23 conforms to the back 45 of the WS50-type world side impact dummy 40A, but may be too large for the back 45 of the WS5-type world side impact dummy 40B. Accordingly, the chest 41, which is a relatively weak portion of the torso 47, of the WS5-type world side impact dummy 40B may also be protected by the inner bag 23.

In contrast, in the present embodiment, the inner bag 23 is further provided with a gas adjustment hole 70 configured to communicate with the outer bag 21, in addition to the gas circulating hole 24, as shown in FIGS. 17 and 18. The gas circulating hole 24 and the gas adjustment hole 70 are disposed on the occupant side (in the present embodiment, on the WS50-type world side impact dummy 40A side or the WS5-type world side impact dummy 40B side) of the inner bag 23.

The gas adjustment hole 70 is disposed on an upper side relative to the gas circulating hole 24. Preferably, the gas circulating hole 24 is disposed at a lower portion of the inner bag 23 and the gas adjustment hole 70 is disposed at an upper portion of the inner bag 23. The term "lower portion of the inner bag 23" herein means a lower portion relative to the central portion in the upward-downward direction of the inner bag 23. The term "upper portion of the inner bag 23" herein means an upper portion relative to the central portion in the upward-downward direction of the inner bag 23.

Specifically, as shown in FIGS. 17 and 18, the gas circulating hole 24 is preferably disposed at a position overlapping the hip 46 of the WS50-type world side impact dummy 40A seated in the vehicle seat 30 and overlapping the hip 46 of the WS5-type world side impact dummy 40B seated in the vehicle seat 30. Thereby, the pressed outer bag 21 can surely block the gas circulating hole 24 regardless of the somatotype of the occupant, specifically, regardless of whether the occupant is an occupant with a standard somatotype such as the WS50-type world side impact dummy 40A or an occupant with a small somatotype such as the WS5-type world side impact dummy 40B.

Further, as shown in FIGS. 17 and 18, the gas adjustment hole 70 is preferably disposed a position overlapping the shoulder 43 of the WS50-type world side impact dummy 40A seated in the vehicle seat 30 and not overlapping the shoulder 43 of the WS5-type world side impact dummy 40B seated in the vehicle seat 30.

Thereby, similar to the gas circulating hole 24, the pressed outer bag 21 can block the gas adjustment hole 70 when an occupant with a standard somatotype such as the WS50-type world side impact dummy 40A (or an occupant with a bigger somatotype) is seated in the vehicle seat 30, maintaining the inner pressure in the inner bag 23 at a high level. Thus, the inner bag 23 with an inner pressure maintained at a high level can protect the back 45 of an occupant with a standard somatotype such as the WS50-type world side impact dummy 40A (or an occupant with a bigger somatotype).

In contrast, unlike the gas circulating hole 24, the pressed outer bag 21 may not block the gas adjustment hole 70 when an occupant with a small somatotype such as the WS5-type world side impact dummy 40B is seated in the vehicle seat 30. In this case, the gas inside the inner bag 23 can flow into the outer bag 21 through the gas adjustment hole 70, allowing the inner bag 23 to be soft with an appropriately adjusted inner pressure. Thus, even when the inner bag 23 overlaps the chest 41 of an occupant with a small somatotype such as the WS5-type world side impact dummy 40B, the inner bag 23 in a soft state can protect the chest 41.

As described above, in the present embodiment, the gas adjustment hole 70 can appropriately control the inner pressure in the side airbag 20, especially the inner bag 23, in accordance with the somatotype of an occupant seated, appropriately protecting the occupant regardless of the somatotype thereof.

Figure 19:
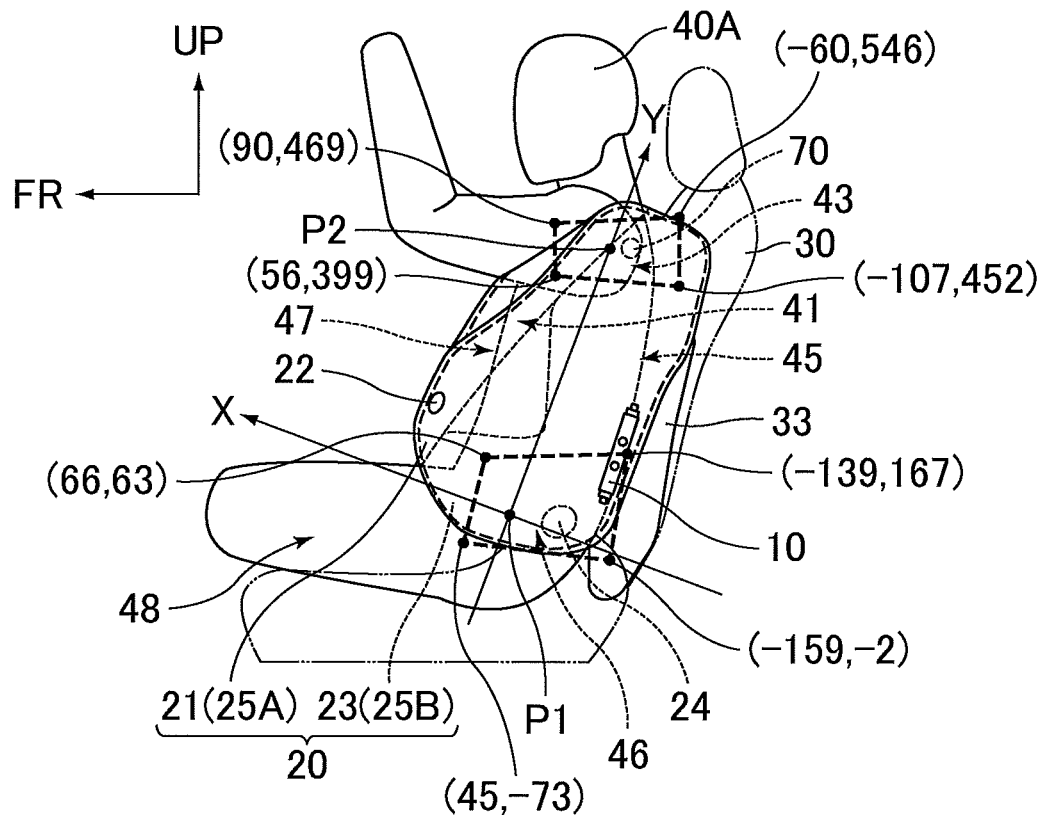
FIG. 19 is a schematic view of the side airbag device of Embodiment 3 illustrating preferred positions of gas adjustment holes and gas circulating holes.

A preferred position of the gas adjustment hole 70 is specifically illustrated in FIG. 19. FIG. 19 is a schematic view of the side airbag device of Embodiment 3 illustrating preferred positions of gas adjustment holes and gas circulating holes. FIG. 19 is a side view of the side airbag device of Embodiment 3. In a state where the WS50-type world side impact dummy 40A is seated in the vehicle seat 30, as illustrated in FIG. 19, first, the center of pivot of a thigh 48 is defined as a first point P1 (also referred to as the "hip point") and the center of joint between the shoulder 43 and the torso 47 is defined as a second point P2. Next, a two-dimensional coordinate system (X, Y) (unit: mm) is defined by the origin that is the first point P1, the Y axis that is a first straight line (also referred to as the "torso line") with the positive direction thereof extending from the first point P1 to the second point P2, and the X axis that is a second straight line perpendicular to the first straight line and with the positive direction thereof extending toward a front side of the WS50-type world side impact dummy 40A. In this two-dimensional coordinate system, the gas adjustment hole 70 preferably overlaps an internal region of a quadrilateral with four apexes (90, 469), (56, 399), (−107, 452), and (−60, 546).

A preferred position of the gas circulating hole 24 is also specifically illustrated in FIG. 19. In a state where the WS50-type world side impact dummy 40A is seated in the vehicle seat 30, as illustrated in FIG. 19, first, the center of pivot of a thigh 48 is defined as a first point P1 and the center of joint between the shoulder 43 and the torso 47 is defined as a second point P2. Next, a two-dimensional coordinate system (X, Y) (unit: mm) is defined by the origin that is the first point P1, the Y axis that is a first straight line with the positive direction thereof extending from the first point P1 to the second point P2, and the X axis that is a second straight line perpendicular to the first straight line and with the positive direction thereof extending toward a front side of the WS50-type world side impact dummy 40A. In this two-dimensional coordinate system, the gas circulating hole 24 preferably overlaps an internal region of a quadrilateral with four apexes (66, 63), (45, −73), (−159, −2), and (−139, 167).

As shown in FIGS. 17 and 18, the gas adjustment hole 70 preferably has an equal or smaller opening area than the gas circulating hole 24. Thereby, the gas adjustment hole 70 can easily control the inner pressure in the inner bag 23 as appropriate in accordance with the somatotype of the occupant seated.

The gas adjustment hole 70 may have any shape, and preferably has a circular shape as shown in FIGS. 17 and 18.

Figure 20:
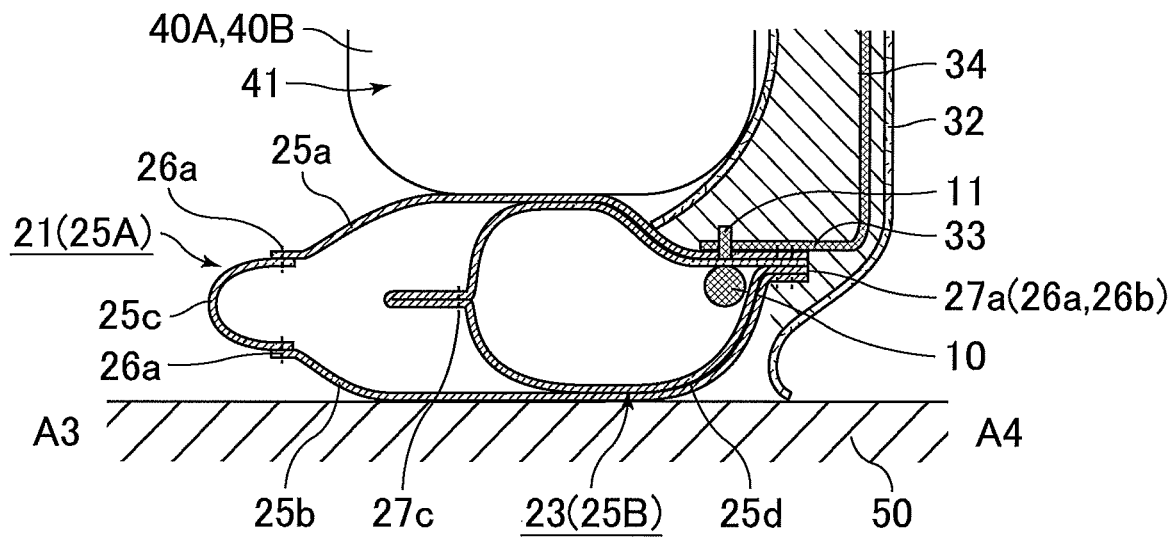
FIG. 20 is a schematic cross-sectional view taken along the line A3-A4 in FIGS. 17 and 18.

As shown in FIGS. 17 and 18, in the inner bag 23, the base fabric piece 25*d* may be joined at a joint portion 27*c*. Thereby, a non-inflated portion is formed in part of the inner bag 23. Thus, even when the inner bag 23 has an expanding shape from an upper portion toward a lower portion so as to protect the thigh 48 of an occupant (in the present embodiment, the WS50-type world side impact dummy 40A or the WS5-type world side impact dummy 40B) as shown in FIG. 20, the non-inflated portion at the central portion of the inner bag 23 can reduce overlapping of the inner bag 23 with the chest 41 and its vicinity of the occupant. Thereby, the outer bag 21 in a soft state alone can easily protect the chest 41 of the occupant. FIG. 20 is a schematic cross-sectional view taken along the line A3-A4 in FIGS. 17 and 18.

The above embodiments are not intended to limit the scope of the invention. Each of the features in the embodiments may appropriately be deleted, supplemented, modified, and/or combined within the spirit of the invention.

What is claimed is:

1. A side airbag device, comprising:
an inflator configured to generate a gas; and
a side airbag that is stored in a folded state in a side portion of a seatback of a vehicle seat and is inflatable and deployable in a lateral space between a vehicle sidewall and a side portion of an occupant seated in the vehicle seat in response to the gas upon activation of the inflator to protect the side portion of the occupant,
the side airbag including an outer bag and an inner bag, the inner bag housing the inflator and being disposed at a rear portion of the outer bag along an extending direction of the seatback,
the outer bag being provided with a vent hole configured to communicate with an outside of the side airbag,
the inner bag being provided with a gas circulating hole configured to communicate with the outer bag,
the gas circulating hole being disposed at a position to be blocked by the outer bag when the side airbag in an inflated and deployed state is pressed between the occupant and the vehicle sidewall,
wherein the inner bag is further provided with, in addition to the gas circulating hole, a gas adjustment hole configured to communicate with the outer bag,
the gas circulating hole and the gas adjustment hole are disposed on an occupant side of the inner bag, and
the gas adjustment hole is disposed on an upper side relative to the gas circulating hole.

2. The side airbag device according to claim 1, wherein the gas circulating hole is disposed at a central portion or on a rear side relative to the central portion in a forward-backward direction of the inner bag.

3. The side airbag according to claim 1, wherein the gas circulating hole is disposed on an occupant side of the inner bag.

4. The side airbag device according to claim 1, wherein the gas circulating hole is disposed at a lower portion of the inner bag.

5. The side airbag device according to claim 1, wherein the inner bag is made from a bag-shaped inner base fabric piece, the bag-shaped inner base fabric piece being disposed inside the outer bag and including an edge joined together with part of an edge of an outer base fabric piece composing the outer bag.

6. The side airbag device according to claim 1, wherein the inner bag is made from a base fabric piece that composes a region defined by part of an outer base fabric piece composing the outer bag and a partition base fabric piece joined to the outer base fabric piece so as to partition a space inside the outer bag.

7. The side airbag device according to claim 1,
wherein the gas circulating hole is disposed at a lower portion of the inner bag, and
the gas adjustment hole is disposed at an upper portion of the inner bag.

8. The side airbag device according to claim 1, wherein the gas adjustment hole has an equal or smaller opening area than the gas circulating hole.

9. The side airbag device according to claim 1, wherein, in a side view of the side airbag device, the gas circulating hole is disposed at a position overlapping a hip of a WS50 world side impact dummy seated in the vehicle seat and overlapping a hip of a WS5 world side impact dummy seated in the vehicle seat.

10. The side airbag device according to claim 1, wherein, in a side view of the side airbag device, the gas adjustment hole is disposed at a position overlapping a shoulder of a WS50 world side impact dummy seated in the vehicle seat and not overlapping a shoulder of a WS5 world side impact dummy seated in the vehicle seat.

11. The side airbag device according to claim 10,
wherein the gas adjustment hole overlaps an internal region of a quadrilateral with four apexes (90, 469), (56, 399), (−107, 452), and (−60, 546) in a two-dimensional coordinate system (X, Y) (unit: mm) defined by an origin, a Y axis, and an X axis each defined as follows:
in a state where a WS50 world side impact dummy is seated in the vehicle seat, with a center of pivot of a thigh being defined as a first point and a center of joint between a shoulder and a torso being defined as a second point, the origin is the first point, the Y axis is a first straight line with a positive direction thereof extending from the first point to the second point, and the X axis is a second straight line perpendicular to the first straight line and with a positive direction thereof extending toward a front side of the WS50 world side impact dummy in a side view of the side airbag device.

12. The side airbag device according to claim 9, wherein the gas circulating hole overlaps an internal region of a quadrilateral with four apexes (66, 63), (45, −73), (−159, −2), and (−139, 167) in a two-dimensional coordinate system (X, Y) (unit: mm) defined by an origin, a Y axis, and an X axis each defined as follows:
in a state where a WS50 world side impact dummy is seated in the vehicle seat, with a center of pivot of a thigh being defined as a first point and a center of joint between a shoulder and a torso being defined as a second point, the origin is the first point, the Y axis is a first straight line with a positive direction thereof extending from the first point to the second point, and the X axis is a second straight line perpendicular to the first straight line and with a positive direction thereof extending toward a front side of the WS50 world side impact dummy in a side view of the side airbag device.

* * * * *